United States Patent
Nagano et al.

(10) Patent No.: US 12,449,266 B2
(45) Date of Patent: Oct. 21, 2025

(54) INFORMATION PROCESSING APPARATUS, INFORMATION PROCESSING METHOD, AND STORAGE MEDIUM

(71) Applicant: SONY GROUP CORPORATION, Tokyo (JP)

(72) Inventors: Kae Nagano, Tokyo (JP); Taizo Shirai, Tokyo (JP); Noriyuki Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 276 days.

(21) Appl. No.: 17/926,568

(22) PCT Filed: May 25, 2021

(86) PCT No.: PCT/JP2021/019747
§ 371 (c)(1),
(2) Date: Nov. 18, 2022

(87) PCT Pub. No.: WO2021/246236
PCT Pub. Date: Dec. 9, 2021

(65) Prior Publication Data
US 2023/0204366 A1 Jun. 29, 2023

(30) Foreign Application Priority Data
Jun. 1, 2020 (JP) .................................. 2020-095743

(51) Int. Cl.
*G01C 21/34* (2006.01)
*G01C 21/36* (2006.01)

(52) U.S. Cl.
CPC ....... *G01C 21/343* (2013.01); *G01C 21/3614* (2013.01)

(58) Field of Classification Search
CPC .. G01C 21/343; G01C 21/3614; G06Q 10/02; G06Q 10/08; G06Q 30/06; G06Q 40/02;
(Continued)

(56) References Cited

U.S. PATENT DOCUMENTS 6,119,095 A * 9/2000 Morita .................... G06Q 10/02
705/5
11,087,291 B2 * 8/2021 Onimaru ............ G01C 21/3691
(Continued)

FOREIGN PATENT DOCUMENTS

JP 2019-159360 A 9/2019
JP 2019-197396 A 11/2019
(Continued)

OTHER PUBLICATIONS

International Search Report and Written Opinion of PCT Application No. PCT/JP2021/019747, issued on Aug. 3, 2021, 10 pages of ISRWO.

*Primary Examiner* — Muhammad Shafi
(74) *Attorney, Agent, or Firm* — CHIP LAW GROUP

(57) ABSTRACT

A setting section that sets one or more tasks that are scheduled to be executed during travel from a departure point to an arrival point of an itinerary, a determination section that, on the basis of the departure point, the arrival point, and the one or more tasks, determines an itinerary plan including one or more travel means from the departure point to the arrival point and a task that is scheduled to be executed during travel with each of the travel means, a prediction section that predicts whether or not a task performed during execution of the itinerary plan will end before arrival of the travel means at a target point that is supposed to be reached when the task ends, and a change section that changes the itinerary plan in accordance with a result of prediction by the prediction section, are included.

16 Claims, 23 Drawing Sheets

(58) Field of Classification Search
CPC ............. G06Q 2220/00; G06Q 10/047; G06Q 10/109; G06Q 30/0283; G06Q 40/08; G06Q 50/10; G06Q 50/40; G08G 1/096725; G08G 1/096741; G08G 1/096775; G08G 1/0969; G08G 1/202
USPC ........................................................ 701/533
See application file for complete search history.

(56) References Cited

U.S. PATENT DOCUMENTS

| | | | |
|---|---|---|---|
| 2007/0150320 A1* | 6/2007 | Huang | G01C 21/3484 |
| | | | 705/5 |
| 2017/0147989 A1* | 5/2017 | Onimaru | G08G 1/0145 |
| 2018/0172458 A1* | 6/2018 | Yamamoto | G01C 21/3438 |
| 2019/0156672 A1* | 5/2019 | Konishi | G08G 1/20 |

FOREIGN PATENT DOCUMENTS

| | | |
|---|---|---|
| JP | 2020-107007 A | 7/2020 |
| WO | 2019/082774 A1 | 5/2019 |
| WO | 2019/097944 A1 | 5/2019 |
| WO | 2019/202881 A1 | 10/2019 |

* cited by examiner

FIG.7

| TASK | ROAD REQUIREMENTS | | | | VEHICLE TYPE REQUIREMENTS | | | | USER |
|---|---|---|---|---|---|---|---|---|---|
| | PAVED ROAD FREE FROM UNEVENNESS | NO CONGESTION | GOOD SCENERY | GOOD PUBLIC ORDER | COMPATIBLE WITH Wi-Fi | COMFORTABLE RIDE | DESK | FULL-FLAT | ALLERGIES |
| JOB | ✓ | ✓ | | ✓ | ✓ | ✓ | ✓ | | |
| VIEWING AND LISTENING OF CONTENT | ✓ | ✓ | | ✓ | ✓ | ✓ | | | |
| LIGHT MEAL | ✓ | ✓ | | ✓ | | ✓ | | | ✓ |
| SLEEP | ✓ | ✓ | | ✓ | | ✓ | | | |
| GAME | ✓ | ✓ | | ✓ | ✓ | | | | |
| TOURISM | | ✓ | ✓ | ✓ | | | | | |

FIG. 12

| | | MEASURE PROPOSALS | EXCESS TIME | ADDITIONAL FEE | CHANGE IN TASK |
|---|---|---|---|---|---|
| (1) | RAISE SPEED | CHANGE TO ROUTE THAT ALLOWS FOR SPEED (e.g.) USING EXPRESSWAY | - | ✓ EXPRESSWAY FEE | - |
| (2) | CHANGE TRAVEL MEANS | INCORPORATE USE OF MOBILITY CAPABLE OF TRAVELING AT HIGH SPEED (e.g.) CHANGE TO ROUTE THAT USES LIMITED EXPRESS TRAIN | - | ✓ LIMITED EXPRESS FEE | - |
| (3) | REDUCE TASKS | REDUCE NUMBER OF PLACES TO STOP BY (e.g.) NOT STOPPING BY CAFE | - | - | ✓ |
| (4) | ADJUST TASKS | ADJUST SERVICE CONTENTS (e.g.) ABANDON STOPPING BY CAFE AND SWITCH TO DELIVERY OF THAT CAFE TO RECEIVE ON WAY OF ITINERARY | - | ✓ DELIVERY FEE | - |
| (5) | PRIORITIZE TASKS | ADD NEW TASK FOR LENGTH OF TIME EQUAL TO DELAY TIME (e.g.) ADD VIEWING AND LISTENING CONTENTS | ✓ | - | ✓ |

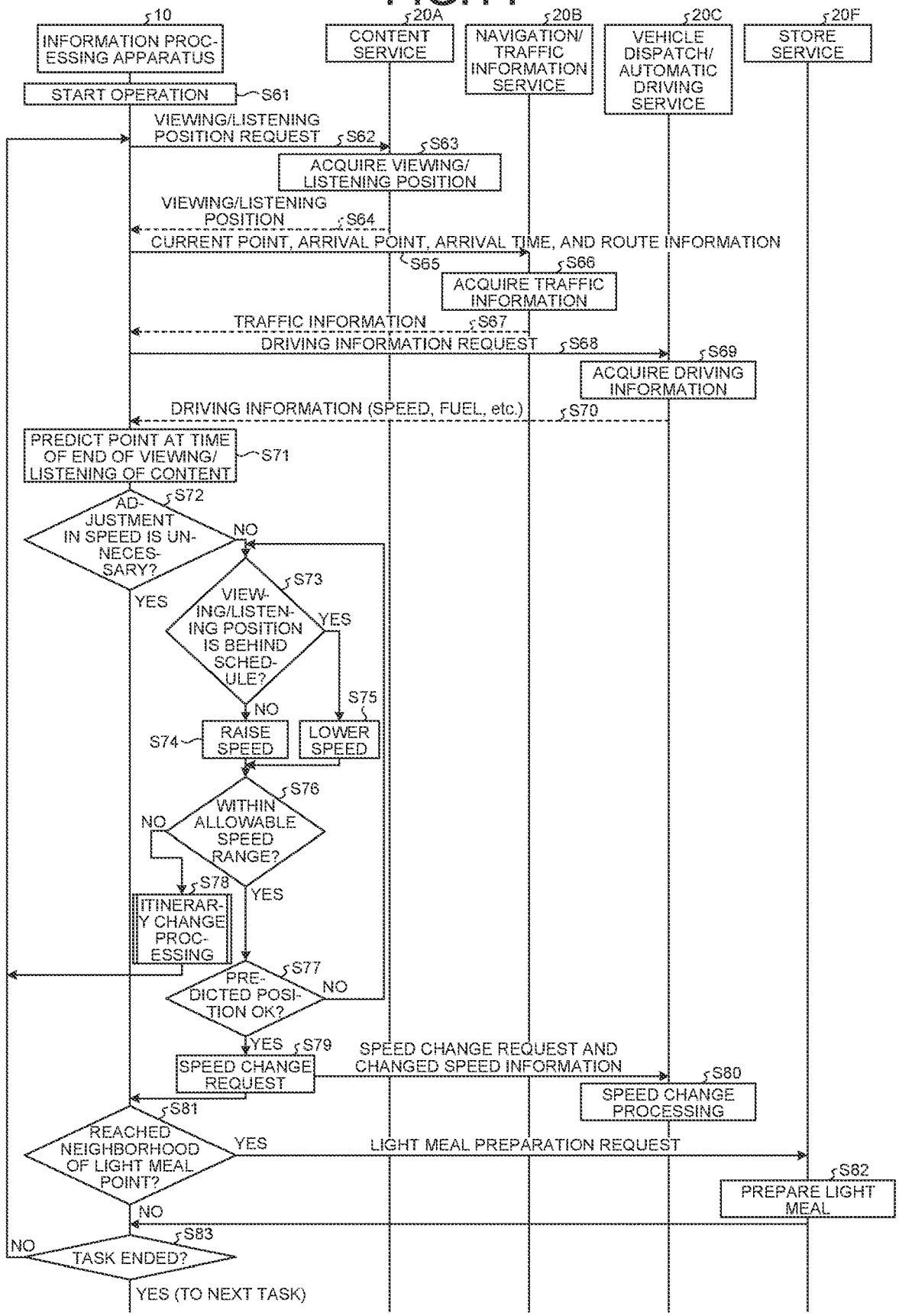

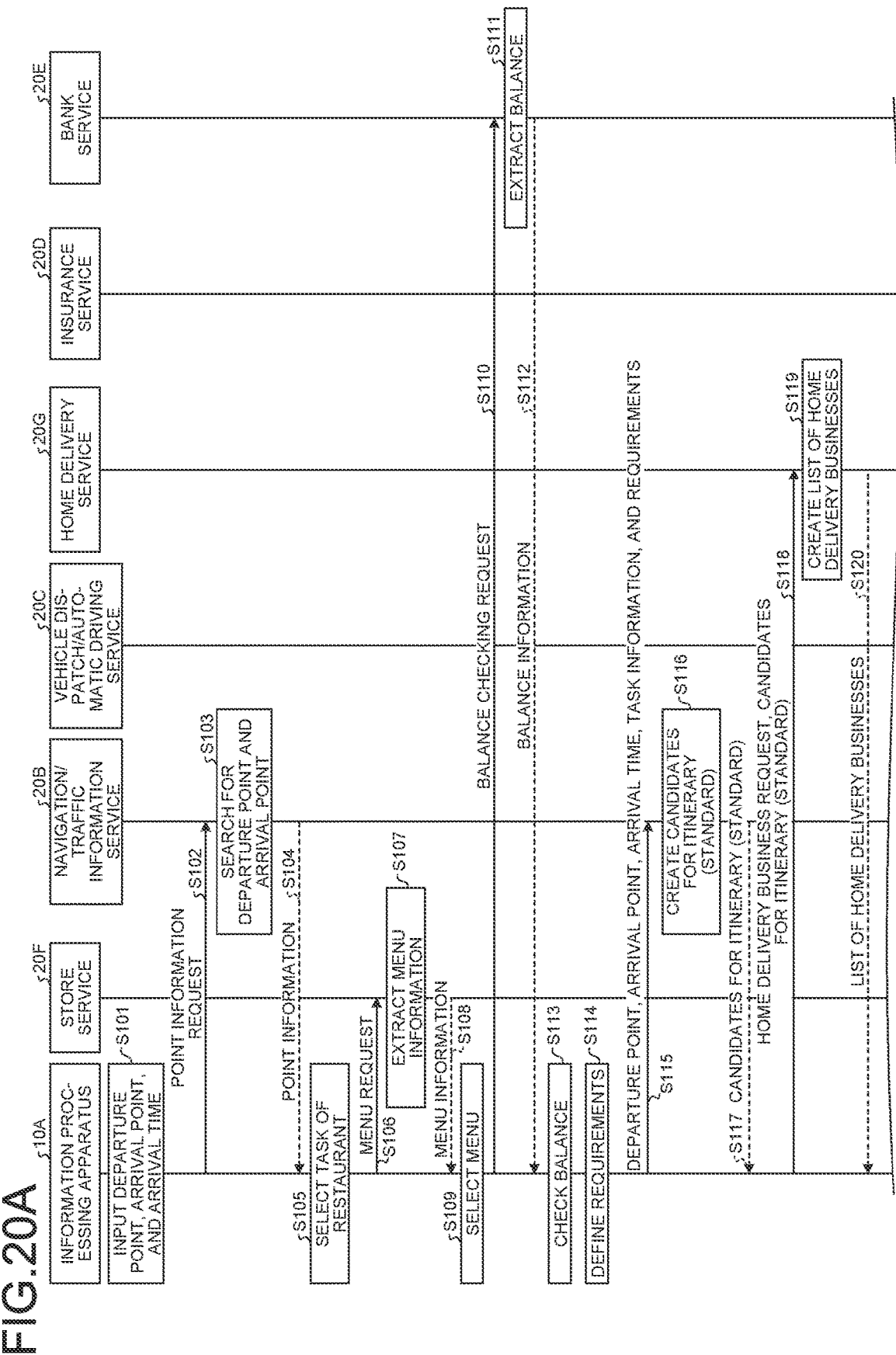

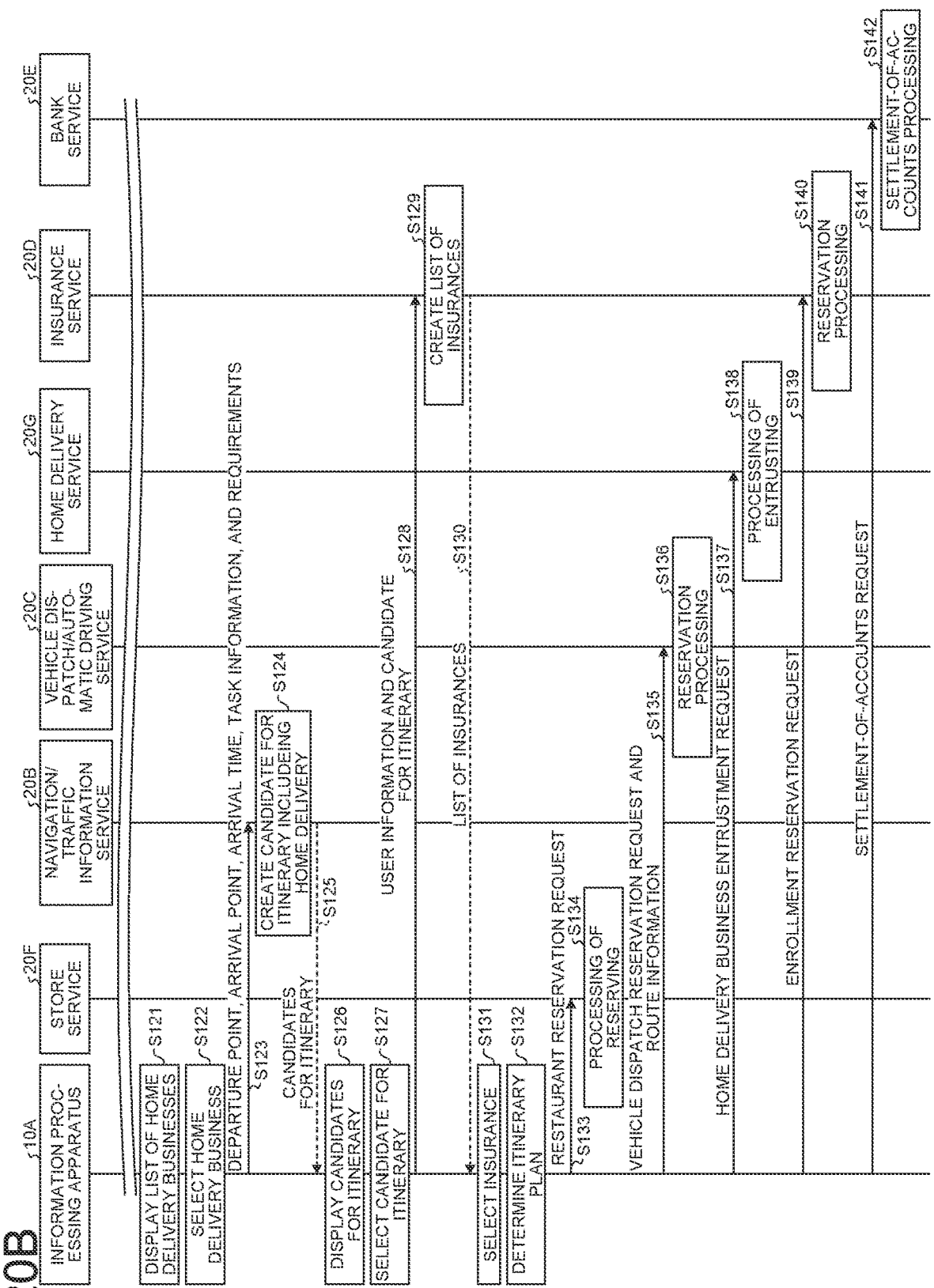

INFORMATION PROCESSING APPARATUS, INFORMATION PROCESSING METHOD, AND STORAGE MEDIUM

CROSS REFERENCE TO RELATED APPLICATIONS

This application is a U.S. National Phase of International Patent Application No. PCT/JP2021/019747 filed on May 25, 2021, which claims priority benefit of Japanese Patent Application No. JP 2020-095743 filed in the Japan Patent Office on Jun. 1, 2020. Each of the above-referenced applications is hereby incorporated herein by reference in its entirety.

FIELD

The present disclosure relates to an information processing apparatus, an information processing method, and a storage medium.

BACKGROUND

These days, with the development of technology of an automatic driving system, performing of various tasks (jobs, movie appreciation, sleep, etc.) in a vehicle is becoming possible by freedom from driving during travel of an automatic driving-based vehicle, in addition to during travel on a railway so far. However, conventionally, in mobility infrastructures such as railways, automobiles, and aircraft, a way of spending time during travel has been only a secondary item for killing a long travel time. Hence, there are situations where the quality of behavior cannot be enhanced, such as a situation where the traveler arrives at the target place during the viewing and listening of content that the traveler is viewing and the empathy is interrupted, and a situation where the traveler has too much layover time on the hands but does not have enough time to stop by a store and have a meal.

As a technology to improve the convenience of such mobility infrastructures, a system in which a method for receiving a delivery article is generated on the basis of information of a delivery article to be delivered to a user and user information is disclosed (for example, Patent Literature 1).

CITATION LIST

Patent Literature

Patent Literature 1: JP 2019-197396A

SUMMARY

Technical Problem

However, in the conventional technology, there is no case where the operation of a travel means is controlled in accordance with a task during travel with the travel means, and it has been difficult to improve the quality of the task during travel.

Thus, the present disclosure proposes an information processing apparatus, an information processing method, and a storage medium capable of improving the quality of a task during travel with a travel means.

Solution to Problem

In order to solve the above problem, an information processing apparatus according to one aspect of the present disclosure includes: a setting section that sets one or more tasks that are scheduled to be executed during travel from a departure point to an arrival point of an itinerary; a determination section that, on the basis of the departure point, the arrival point, and the one or more tasks, determines an itinerary plan including one or more travel means from the departure point to the arrival point and a task that is scheduled to be executed during travel with each of the travel means; a prediction section that predicts whether or not a task performed during execution of the itinerary plan will end before arrival of the travel means at a target point that is supposed to be reached when the task ends; and a change section that changes the itinerary plan in accordance with a result of prediction by the prediction section.

Advantageous Effects of Invention

According to the present disclosure, the quality of a task during travel with a travel means can be improved.

BRIEF DESCRIPTION OF DRAWINGS

FIG. 7 is a diagram illustrating an example of requirements corresponding to tasks.

FIG. 12 is a diagram illustrating an example of measure proposals for changing an itinerary when a plan is delayed.

FIG. 14 is a sequence diagram illustrating an example of a flow of plan execution processing of the information processing apparatus according to the first embodiment.

FIG. 20A is a sequence diagram illustrating an example of a flow of itinerary planning processing of the information processing apparatus according to the second embodiment.

FIG. 20B is a sequence diagram illustrating an example of a flow of itinerary planning processing of the information processing apparatus according to the second embodiment.

DESCRIPTION OF EMBODIMENTS

Figure 1:
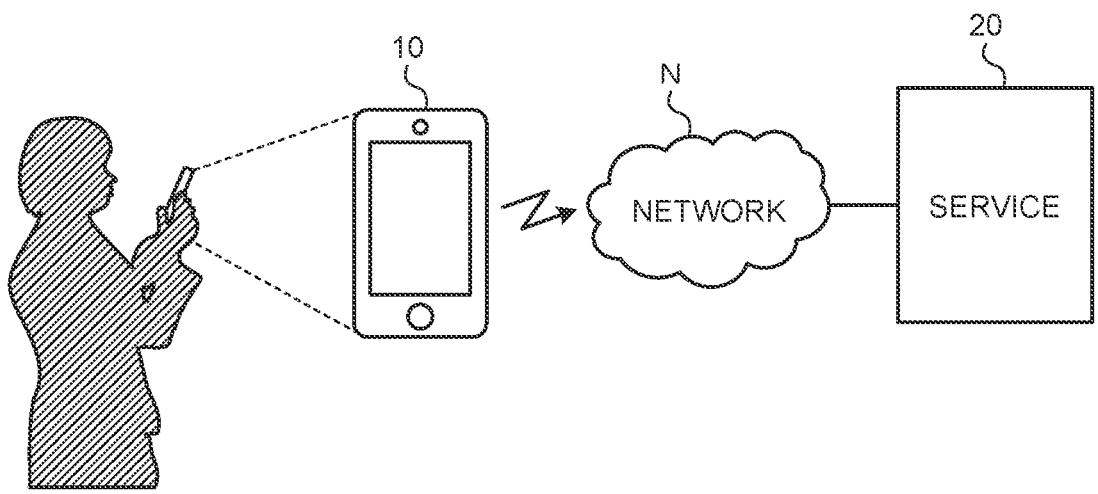
FIG. 1 is a diagram illustrating an example of a network configuration of a system according to a first embodiment.

Hereinbelow, embodiments of the present disclosure are described in detail based on the drawings. In the following embodiments, the same parts, etc. may be denoted by the same reference numerals, and a repeated description may be omitted.

The present disclosure is described according to the following item order.

1. First Embodiment
  1-1. Configuration of system according to first embodiment
  1-2. Configuration of blocks of information processing apparatus according to first embodiment
  1-3. Itinerary planning processing of information processing apparatus according to first embodiment
  1-4. Plan execution processing of information processing apparatus according to first embodiment
  1-5. Effects of information processing apparatus according to first embodiment
2. Second Embodiment
  2-1. Configuration of blocks of information processing apparatus according to second embodiment
  2-2. Itinerary planning processing of information processing apparatus according to second embodiment
  2-3. Effects of information processing apparatus according to second embodiment
3. Other embodiments
4. Hardware configuration
5. Conclusions 1. First Embodiment (1-1. Configuration of System According to First Embodiment)

Figure 2:
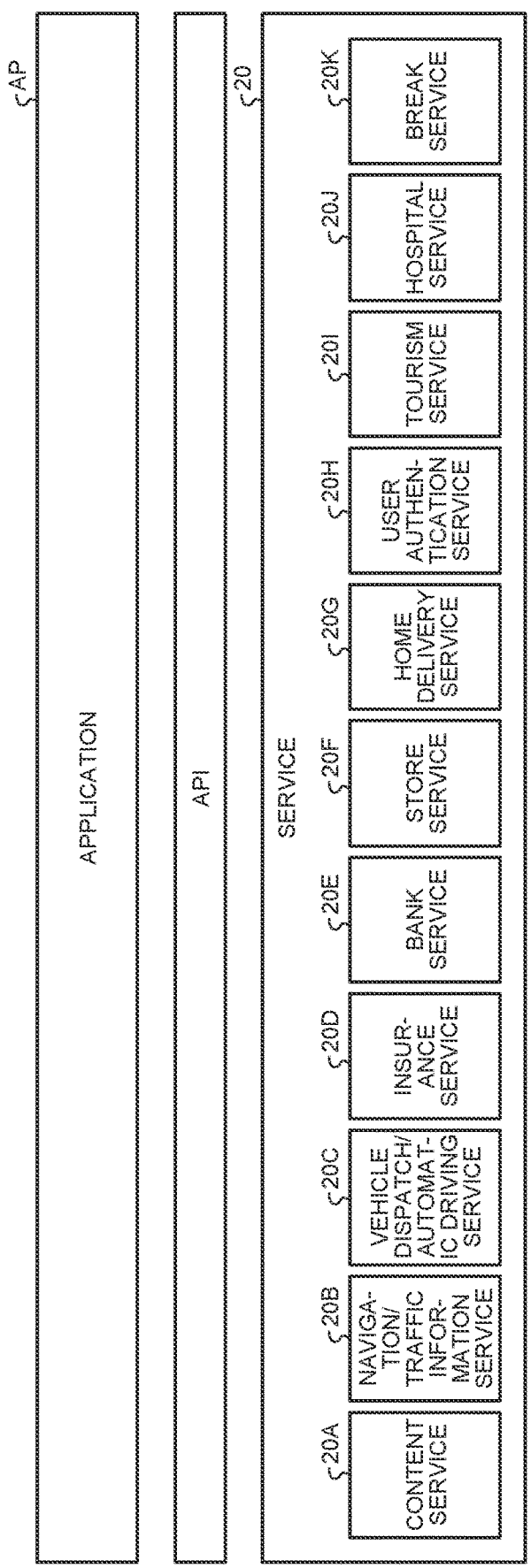
FIG. 2 is a diagram illustrating an example of various services cooperating with an information processing apparatus according to the first embodiment.

FIG. 1 is a diagram illustrating an example of a network configuration of a system according to a first embodiment. FIG. 2 is a diagram illustrating an example of various services cooperating with an information processing apparatus according to the first embodiment. An overview of a configuration of a system according to the present embodiment will now be described with reference to FIG. 1 and FIG. 2.

As illustrated in FIG. 1, a system according to the present embodiment includes an information processing apparatus 10 and a service 20, and is configured such that the information processing apparatus 10 and the service 20 can perform data communication via a network N. The network N is formed of a local area network (LAN), a dedicated line, the Internet, or the like, and may include not only a wired network but also a wireless network.

The information processing apparatus 10 is an apparatus that executes an application for achieving high-quality execution of various tasks in cooperation with the service 20 while the user is traveling with a travel means (hereinafter, simply referred to as an application). The information processing apparatus 10 is, for example, a mobile terminal such as a smartphone or a tablet terminal, which the user can carry and manipulate during travel with a travel means, a navigation system to be mounted on a notebook personal computer (PC) or a vehicle, or the like. The present embodiment will be described on the assumption that the information processing apparatus 10 is a smartphone.

The service 20 provides various services in accordance with requests of an application executed by the information processing apparatus 10 manipulated by the user, and is implemented by a server device or an aggregate thereof. The service 20 is, as illustrated in FIG. 2, an aggregate of various services. As illustrated in FIG. 2, examples of services included in the service 20 include a content service 20A, a navigation/traffic information service 20B, a vehicle dispatch/automatic driving service 20C, an insurance service 20D, a bank service 20E, a store service 20F, a home delivery service 20G, a user authentication service 20H, a tourism service 20I, a hospital service 20J, a break service 20K, etc.

The content service 20A is, for example, a service that provides various pieces of content such as music, dramas, documentary programs, news, and movies. The content service 20A provides various pieces of content in a form of, for example, a subscription system or a product system, The navigation/traffic information service 20B is a service that provides map information and store information around a designated point, information of a route, a distance, and a travel time between points, traffic information of the route, etc.

The vehicle dispatch/automatic driving service 20C is a service that accepts a reservation for use of a vehicle as a travel means and that, when the vehicle reserved by the user is a vehicle capable of automatic driving (automatic running), provides information of the speed, the remaining amount of fuel, etc. during automatic driving of the vehicle and performs driving control of the vehicle capable of automatic driving while performing data communication with the vehicle.

The insurance service 20D is a service that presents various applicable insurances in accordance with a route, a task during travel, and a state of a travel means in an itinerary designated by the user. The insurance service 20D performs, for example, assessment regarding presentation of insurance in the following manner. In the case of an insurance presented on the basis of a route of an itinerary designated by the user, the insurance service 20D lowers evaluation for assessment when a route with impaired safety, such as one passing through a danger zone or passing through a congested road, or a route related to a time delay is included. Further, in the case of an insurance presented on the basis of a task in an itinerary designated by the user, the insurance service 20D manages the state of implementation of the task by a blockchain or the like. For example, when the task is eating and drinking in a restaurant, a cafe, or the like (including both eating and drinking in a store and eating and drinking by taking out), the insurance service 20D performs assessment in the following manner, In the insurance service 20D, a provision state of whether a reserved dish has been provided or not, a time management state of whether a dish has been provided at a reservation time or not, a safety state of whether a problem has occurred in terms of safety such as food poisoning or not, settlement-of-accounts information of whether settlement-of-accounts processing is free from problems or not, etc. are managed by a blockchain or the like. When the past state of the above-described information managed by a blockchain or the like is bad, the insurance service 20D makes an assessment of raising the insurance premium. Further, in the case of an insurance presented on the basis of the state of a travel means in an itinerary designated by the user, the insurance service 20D manages the operating state of the travel means by a blockchain or the like. Further, in the case where the travel means is a vehicle, the insurance service 20D performs assessment on the basis of safety based on an accident rate or the like of automatic driving control for each vehicle type of the vehicle, responsiveness in speed control or the like, an accident history of a taxi driver or the like, etc.; when the evaluation of these is bad, the insurance service 20D makes an assessment of raising the insurance premiums.

The bank service 20E is a service that provides balance inquiry, settlement-of-accounts processing from an account, etc.

The store service 20F is a service that performs acceptance of a reservation, provision of menu information, and provision such as preparation for dish provision when the user comes nearby.

The home delivery service 20G is a service that provides home delivery business and provides information of home delivery business that can be entrusted.

The user authentication service 20H is a service that provides user authentication in a state where an account is securely managed and unauthorized access is blocked.

The tourism service 20I is a service that provides tourism information according to demand of the user, such as recommended tourist spots and non-congested tourist spots.

The hospital service 20J is a service that provides a reservation for a visit to a hospital, information of a hospital department, information of an examination time, information of a non-congested time zone, etc.

The break service 20K is a service that provides acceptance of a reservation for a break facility, a nap facility, or the like, etc.

As illustrated in FIG. 2, the service 20, which is the various services described above, discloses an application program interface (API) for providing services to the outside (the information processing apparatus 10, etc.). Thus, an application AP of the information processing apparatus 10 can receive provision of various services from the service 20 by using the API.

(1-2. Configuration of Blocks of Information Processing Apparatus According to First Embodiment)

Figure 3:
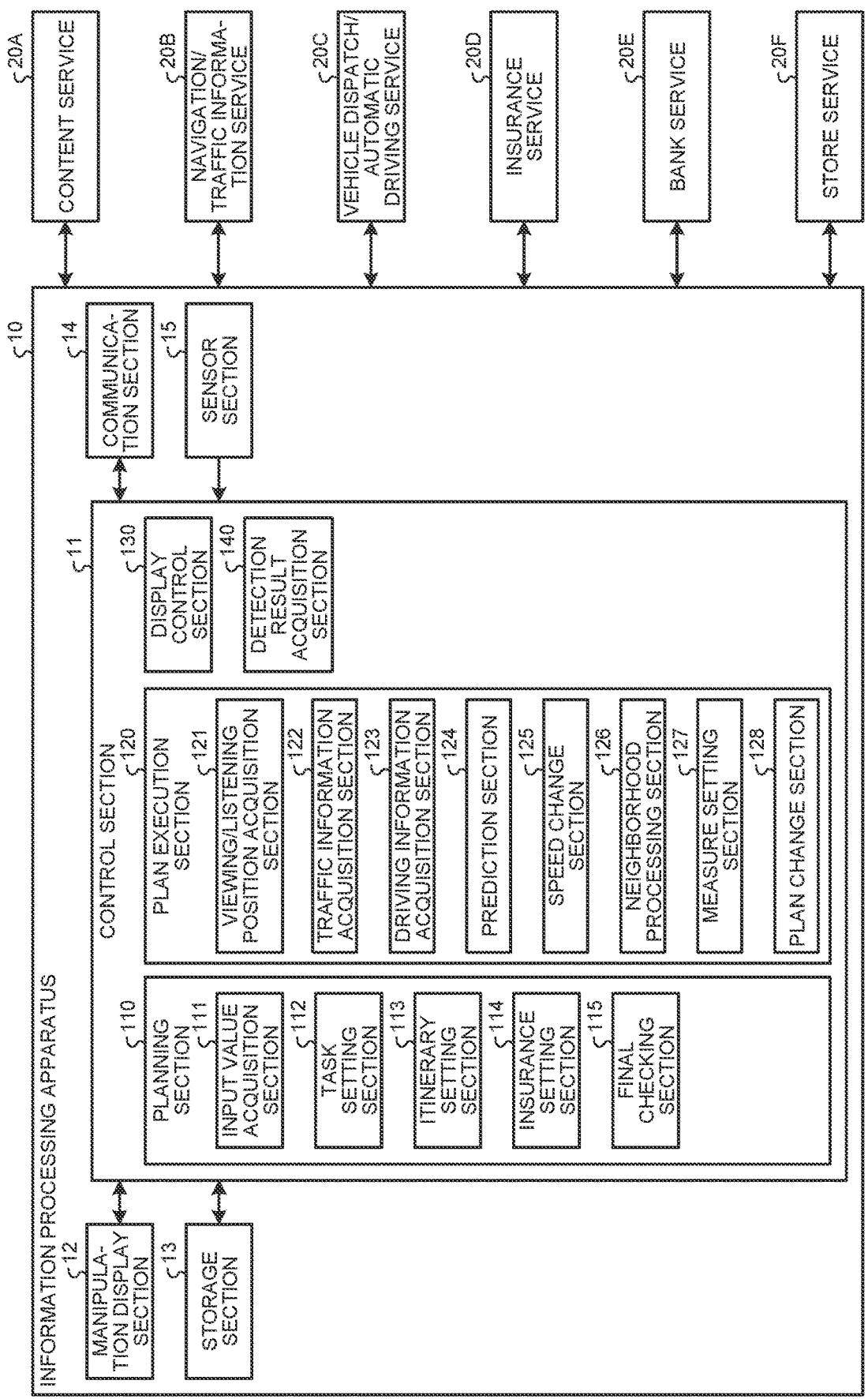
FIG. 3 is a diagram illustrating an example of a block configuration of the information processing apparatus according to the first embodiment.
Figure 4:
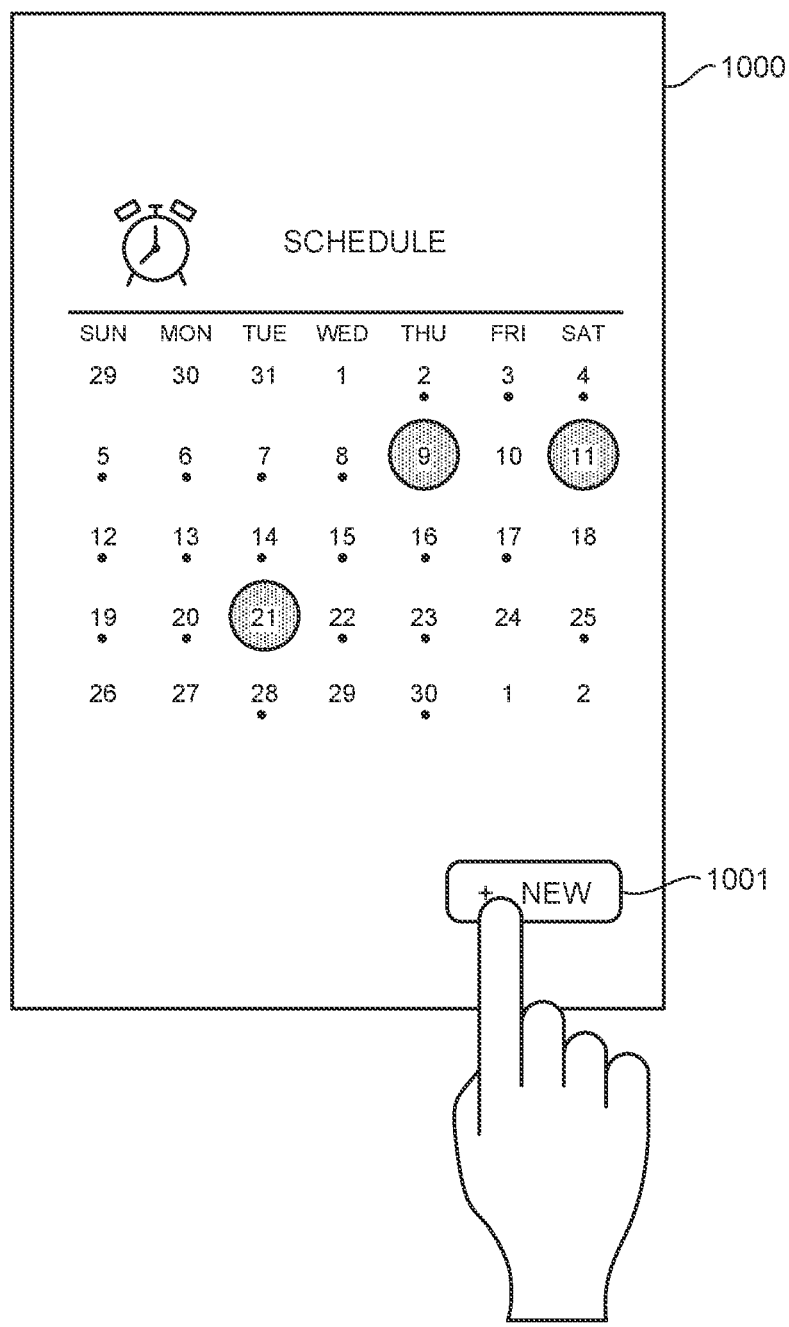
FIG. 4 is a diagram illustrating an example of a new itinerary creation screen of an application of the information processing apparatus according to the first embodiment.
Figure 5:
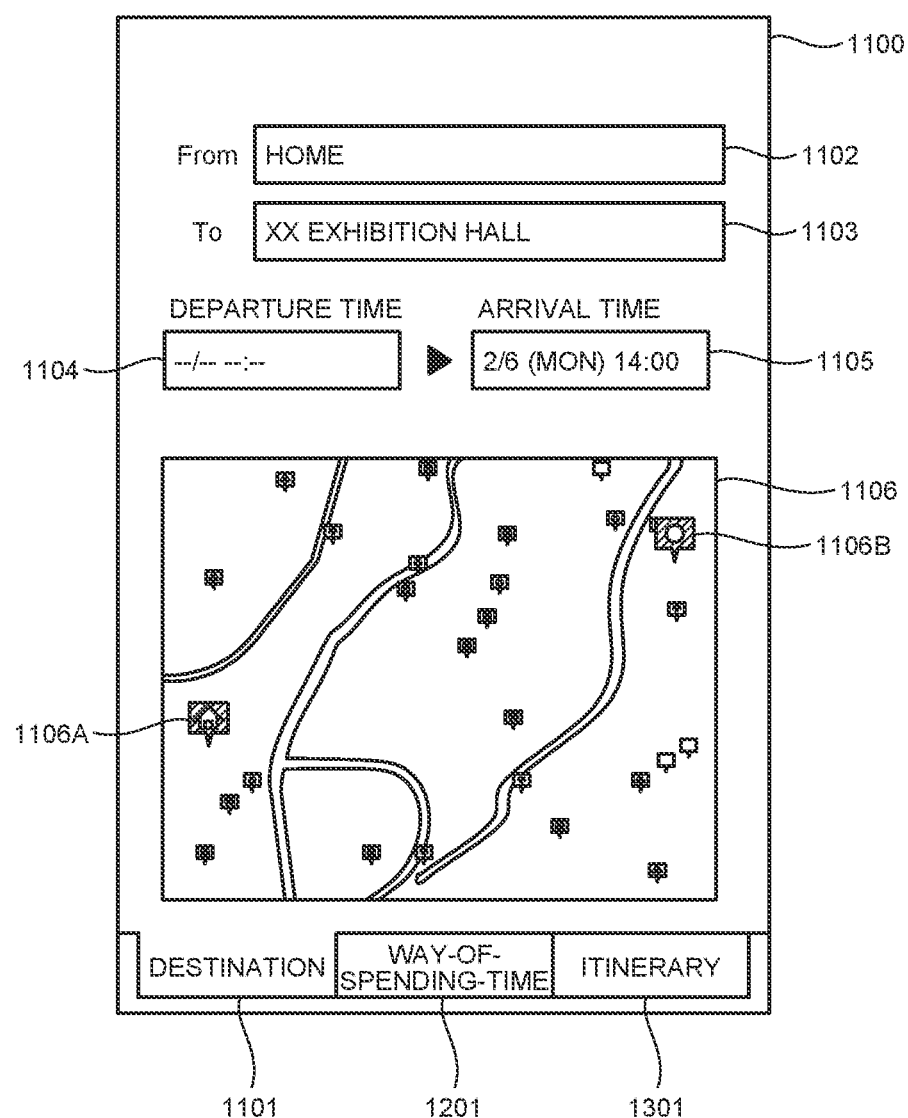
FIG. 5 is a diagram illustrating an example of a point/time input screen of the application of the information processing apparatus according to the first embodiment.
Figure 6:
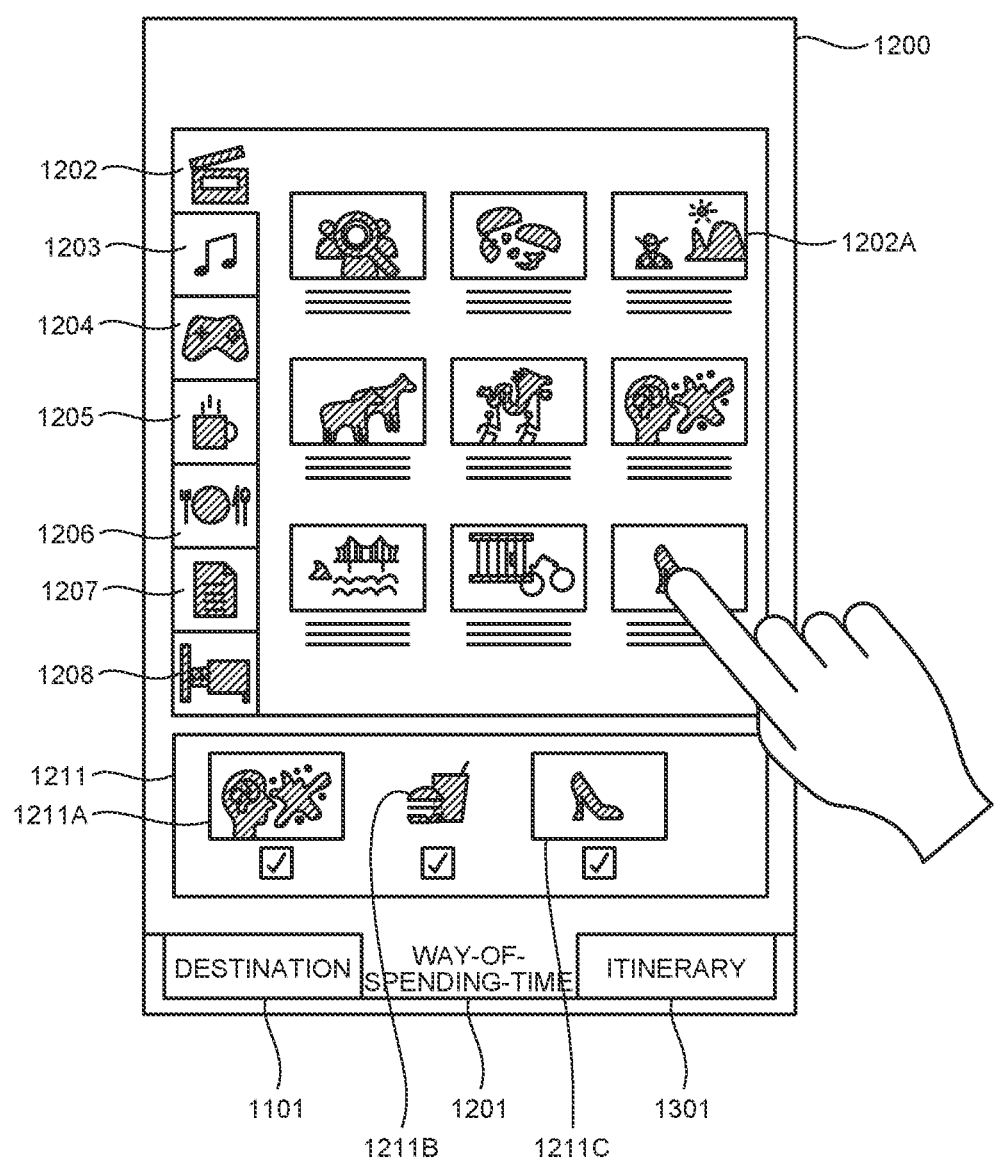
FIG. 6 is a diagram illustrating an example of a task setting screen of the application of the information processing apparatus according to the first embodiment.
Figure 8:
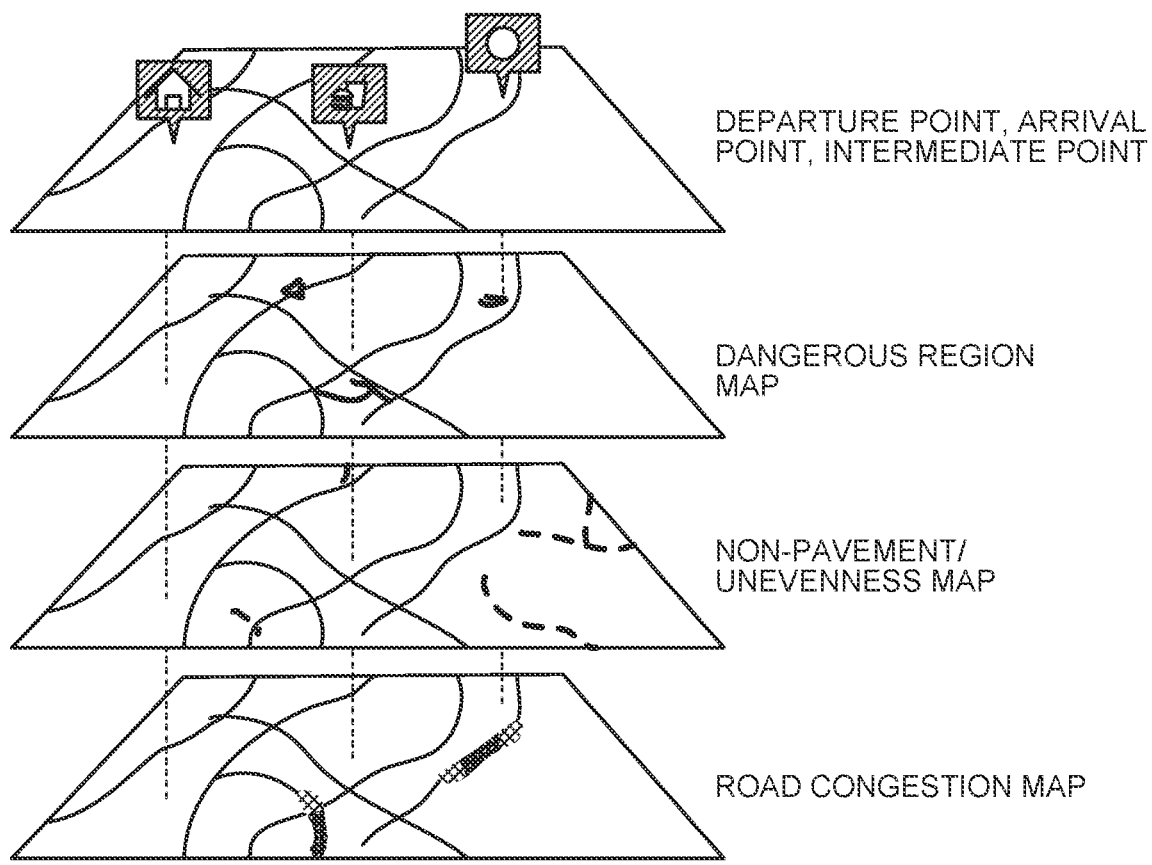
FIG. 8 is a diagram describing an operation of creating a route that satisfies each requirement.
Figure 9:
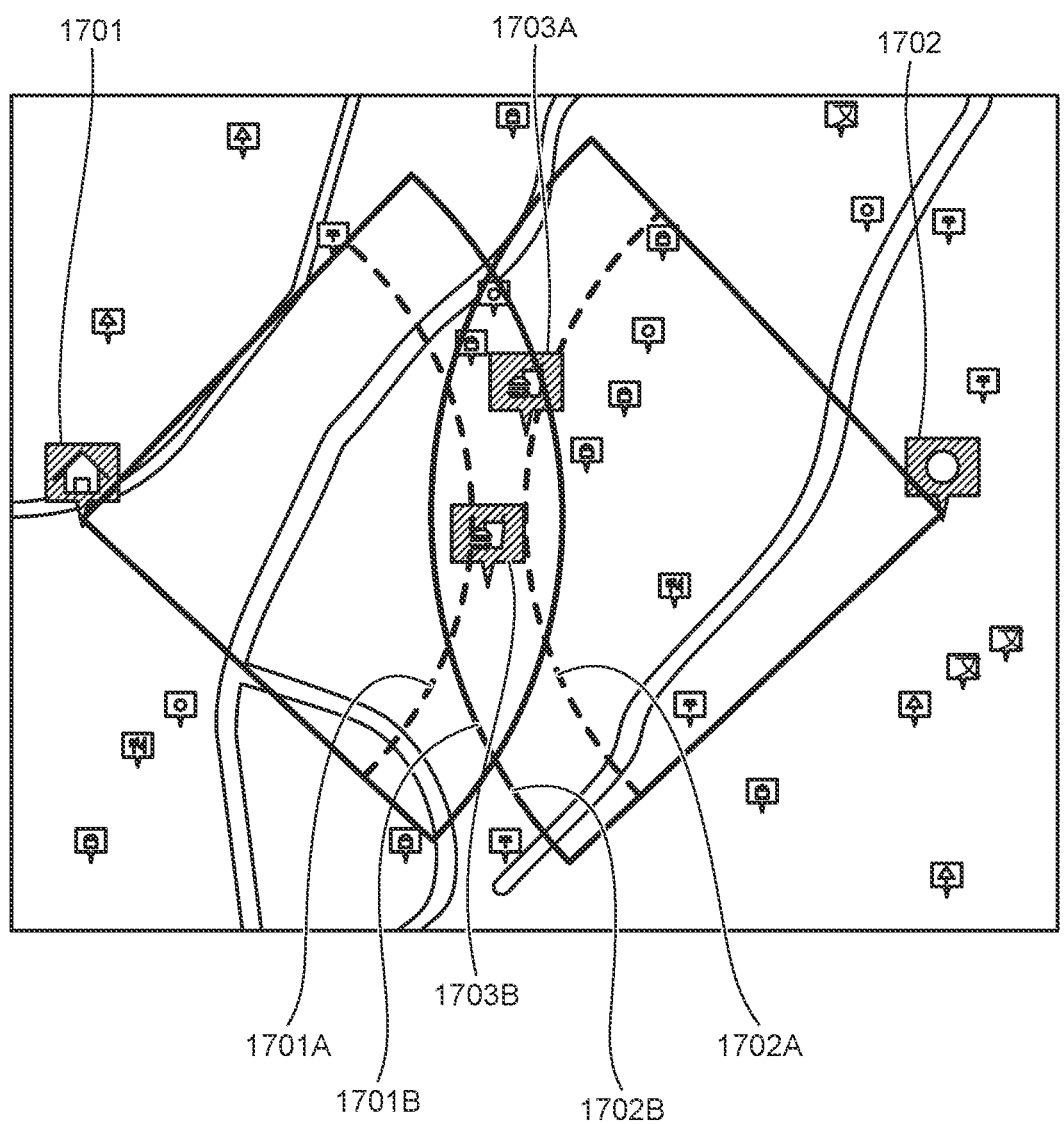
FIG. 9 is a diagram describing an operation of searching for candidates for a store of a light meal.
Figure 10:
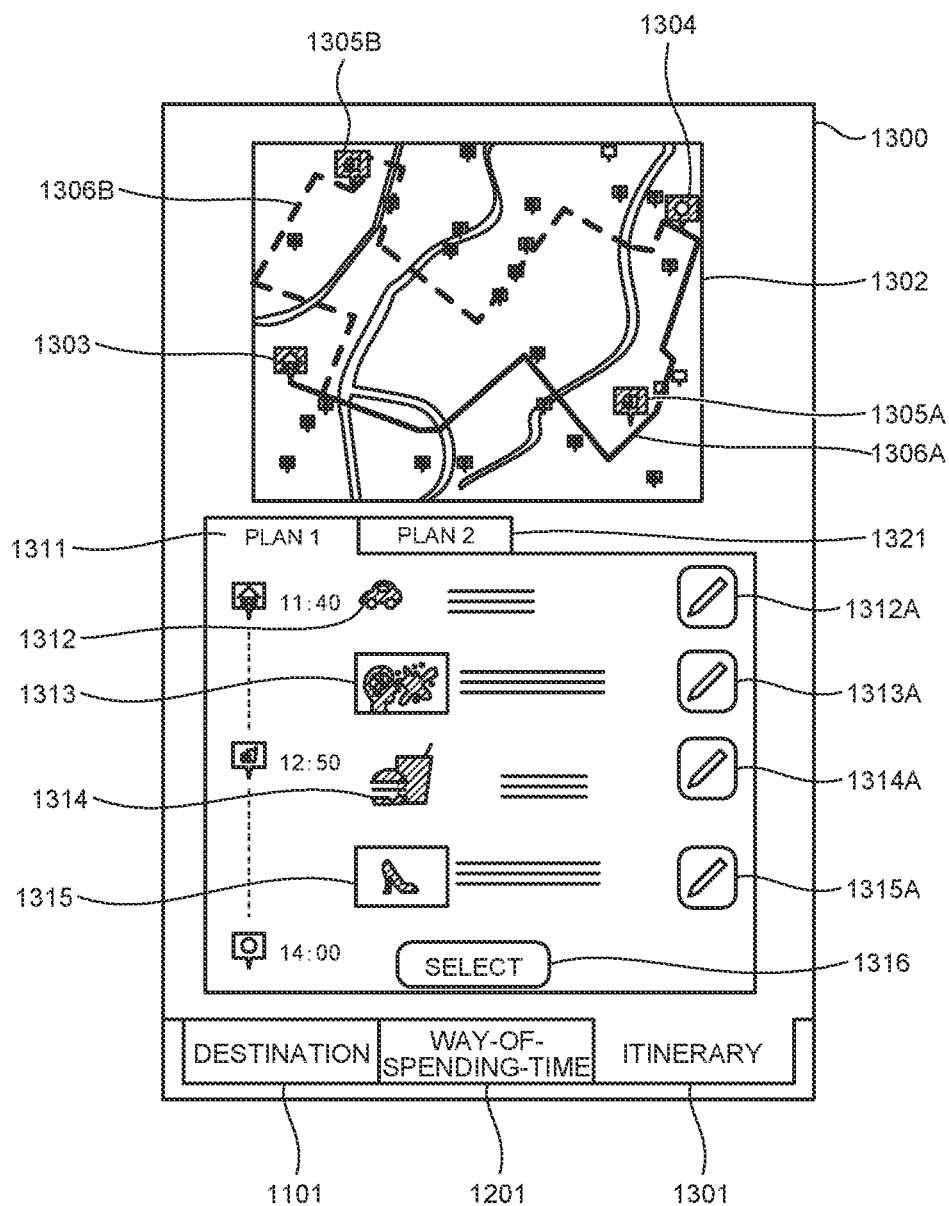
FIG. 10 is a diagram illustrating an example of an itinerary checking screen of the application of the information processing apparatus according to the first embodiment.
Figure 11:
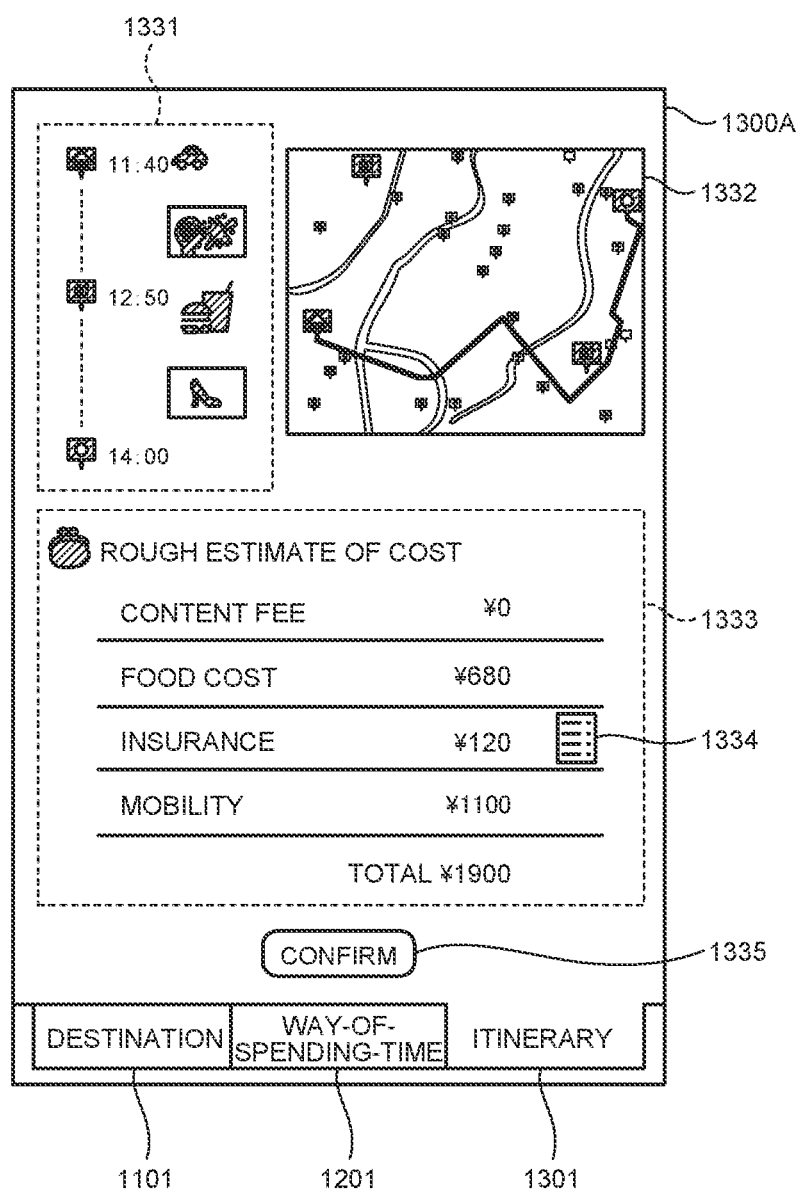
FIG. 11 is a diagram illustrating an example of a cost rough estimate display screen of the application of the information processing apparatus according to the first embodiment.

FIG. 3 is a diagram illustrating an example of a block configuration of the information processing apparatus according to the first embodiment. FIG. 4 is a diagram illustrating an example of a new itinerary creation screen of the application of the information processing apparatus according to the first embodiment. FIG. 5 is a diagram illustrating an example of a point/time input screen of the application of the information processing apparatus according to the first embodiment. FIG. 6 is a diagram illustrating an example of a task setting screen of the application of the information processing apparatus according to the first embodiment. FIG. 7 is a diagram illustrating an example of requirements corresponding to tasks. FIG. 8 is a diagram describing an operation of creating a route that satisfies each requirement. FIG. 9 is a diagram describing an operation of searching for candidates for a store of a light meal. FIG. 10 is a diagram illustrating an example of an itinerary checking screen of the application of the information processing apparatus according to the first embodiment. FIG. 11 is a diagram illustrating an example of a cost rough estimate display screen of the application of the information processing apparatus according to the first embodiment. FIG. 12 is a diagram illustrating an example of measure proposals for changing an itinerary when a plan is delayed. Configurations and operations of blocks of the information processing apparatus 10 according to the present embodiment will now be described with reference to FIG. 3 to FIG. 12.

As illustrated in FIG. 3, the information processing apparatus 10 includes a control section 11, a manipulation display section 12, a storage section 13, a communication section 14, and a sensor section 15.

The control section 11 is a processing section that is in charge of control of the information processing apparatus 10. The control section 11 is implemented by a central processing unit (CPU), a micro processing unit (MPU), or the like. The control section 11 includes, as illustrated in FIG. 3, a planning section 110, a plan execution section 120, a display control section 130, and a detection result acquisition section 140.

The planning section 110 is a processing section that plans an itinerary for, in association with travel with a travel means, performing a task during the travel or at an intermediate point or the like. The planning section 110 is implemented by, for example, an application being executed by a CPU or an MPU. The planning section 110 includes, as illustrated in FIG. 3, an input value acquisition section 111, a task setting section 112, an itinerary setting section 113, an insurance setting section 114, and a final checking section 115.

The input value acquisition section 111 is a processing section that acquires a departure point, an arrival point, and an arrival time of an itinerary under planning inputted on a screen of the application displayed on the manipulation display section 12. By the application being executed by a CPU or an MPU, the display control section 130 causes the manipulation display section 12 to display a new itinerary creation screen 1000 like that illustrated in FIG. 4.

The new itinerary creation screen 1000 illustrated in FIG. 4 is a screen that displays a schedule, and includes a new creation button 1001 for newly planning the itinerary described above. The new itinerary creation screen 1000 illustrated in FIG. 4 indicates that schedules are already registered on the ninth, eleventh, and twenty-first days highlighted by coloring, shading, or the like. When the new creation button 1001 is subjected to a touch manipulation (hereinafter, a manipulation of a button or the like displayed on a screen, including a touch manipulation, is referred to as pushing) by the user, the display control section 130 causes the manipulation display section 12 to display a point/time input screen 1100 illustrated in FIG. 5.

The point/time input screen 1100 illustrated in FIG. 5 is a screen for inputting a departure point, an arrival point, an arrival point, etc. of an itinerary under planning. The point/time input screen 1100 includes, as illustrated in FIG. 5, a departure place input region 1102, an arrival place input region 1103, a departure time input region 1104, an arrival time input region 1105, and a map display region 1106. The point/time input screen 1100 further includes a destination tab 1101, a way-of-spending-time tab 1201, and an itinerary tab 1301. These tabs enter a selected state by being pushed, and the point/time input screen 1100 is a screen displayed by the destination tab 1101 being selected.

The departure place input region 1102 is a field for inputting a departure point of the itinerary under planning. The arrival place input region 1103 is a field for inputting an arrival point of the itinerary under planning. The input value acquisition section 111 acquires the departure point inputted to the departure place input region 1102 and the arrival point inputted to the arrival place input region 1103.

The departure time input region 1104 is a field for inputting a time of departure from the departure point of the itinerary under planning. The arrival time input region 1105 is a field for inputting a time at which arrival at the arrival point of the itinerary under planning is desired (hereinafter, it may be simply referred to as an arrival time). In the present embodiment, it is assumed that, by inputting only an arrival time to the arrival time input region 1105 out of the departure time input region 1104 and the arrival time input region 1105, the departure time is, as described later, obtained by performing backward calculation on the basis of a route, a task, etc. in the planned itinerary. Also a design in which, when a departure time is inputted to the departure time input region 1104, the arrival time is calculated on the basis of a route, a task, etc. in the planned itinerary is possible. Further, also the following design is possible: when a departure time is inputted to the departure time input region 1104 and an arrival time is inputted to the arrival time input region 1105, a prioritized one out of both times is taken as a standard, and the other time is calculated and updated on the basis of a route, a task, etc. in the planned itinerary.

The map display region 1106 is a region where map information including the departure point inputted to the departure place input region 1102 and the arrival point inputted to the arrival place input region 1103 is displayed. When a departure point is inputted to the departure place input region 1102 and an arrival point is inputted to the arrival place input region 1103, the input value acquisition section 111 transmits, to the navigation/traffic information service 20B via the communication section 14, a point information request that requests the positions of the departure point and the arrival point, together with information of these points. Upon receiving the point information request, the navigation/traffic information service 20B searches for the departure point and the arrival point, and transmits, to the information processing apparatus 10, point information including information of the positions of both points. When the point information is received by the input value acquisition section 111 via the communication section 14, the display control section 130 uses the point information as a basis to cause the map display region 1106 to display map information including an icon indicating the departure point and an icon indicating the arrival point. In the example illustrated in FIG. 5, a departure place icon 1106A that is an icon of a departure point and an arrival place icon 1106B that is an icon of an arrival point are displayed in the map display region 1106.

The task setting section 112 is a processing section that sets a task that the user performs on the travel route from the departure point to the arrival point acquired by the input value acquisition section 111. For example, the task setting section 112 sets, as a task to be executed by the user in the itinerary under planning, a task selected on a task setting screen 1200 illustrated in FIG. 6.

The task setting screen 1200 illustrated in FIG. 6 is a screen for setting a task to be performed by the user in the itinerary under planning. The task setting screen 1200 is a screen displayed by the way-of-spending-time tab 1201 being selected from among the destination tab 1101, the way-of-spending-time tab 1201, and the itinerary tab 1301 described above. The task setting screen 1200 includes, as illustrated in FIG. 6, a movie/drama tab 1202, a music tab 1203, a game tab 1204, a light meal tab 1205, a restaurant tab 1206, a job tab 1207, a sleep tab 1208, and a selected task display region 1211.

The movie/drama tab 1202 is a tab for displaying a screen for selecting, as a task to be performed during travel with a travel means in the itinerary under planning, content such as a drama, a documentary program, news, or a movie to be viewed and listened with the information processing apparatus 10 in the travel means. The music tab 1203 is a tab for displaying a screen for selecting, as a task to be performed during travel with a travel means in the itinerary under planning, music to be viewed and listened with the information processing apparatus 10 in the travel means. The game tab 1204 is a tab for displaying a screen for selecting, as a task to be performed during travel with a travel means in the itinerary under planning, a game to be played with the information processing apparatus 10 in the travel means.

The light meal tab 1205 is a tab for displaying a screen for selecting, as a task to be performed during travel with a travel means in the itinerary under planning or a task to be performed by stopping by during the itinerary, a store to eat and drink a light meal. That is, on the screen displayed by the light meal tab 1205, a store from which a light meal to be eaten and drunk in a travel means during travel can be taken out or a store to stop by to eat and drink a light meal during the itinerary under planning is selected.

The restaurant tab 1206 is a tab for displaying a screen for selecting, as a task to be performed during travel with a travel means in the itinerary under planning or a task to be performed by stopping by during the itinerary, a store to eat and drink a dish and a drink of a restaurant. That is, on the screen displayed by the restaurant tab 1206, a restaurant from which a dish and a drink to be eaten and drunk in a travel means during travel can be taken out or a restaurant to stop by to eat and drink a dish and a drink during the itinerary under planning is selected. Further, a design in which a time for having a meal at a restaurant, etc. can be set on the screen displayed by the restaurant tab 1206 is possible.

The job tab 1207 is a tab for displaying a screen for setting, as a task to be performed during travel with a travel means in the itinerary under planning, a job to be performed in the travel means. On the screen displayed by the job tab 1207, for example, a time desired to be secured in order to perform a job in a travel means, etc. are set.

The sleep tab 1208 is a tab for displaying a screen for selecting, as a task to be performed during travel with a travel means in the itinerary under planning or a task to be performed by stopping by during the itinerary, a setting of a time for sleeping or taking a break in the travel means, a setting of background music (BGM) to be reproduced during a break, a break facility to stop by to sleep or take a break, etc.

The tabs for selecting tasks described above are examples, and it is not necessary that all the tabs described above be included. Further, in addition to the tabs described above, for example, other tabs may be included, such as a tab for stopping by a tourist site as a task and a tab for stopping by a government office or the like for an administrative procedure or the like.

The example of the task setting screen 1200 illustrated in FIG. 6 illustrates a state where the movie/drama tab 1202 is selected and thereby a list of content icons 1202A that are icons of various pieces of content is displayed. Specifically, when the movie/drama tab 1202 is selected, the task setting section 112 transmits, to the content service 20A via the communication section 14, user information of the user and a content list request that requests a list of content. Upon receiving the content list request, the content service 20A extracts, for example, content matching the user's preference specified by the received user information, and transmits a list of extracted content to the information processing apparatus 10. When the list of content is received by the task setting section 112 via the communication section 14, the display control section 130 causes the task setting screen 1200 to display content icons 1202A as icons indicating the content of the list. When an icon of content to be viewed and listened in a travel means is selected by the user from the list of content icons 1202A of various pieces of content, the task setting section 112 sets, as a task in the itinerary under planning, the viewing and listening of the content indicated by the selected icon.

An icon indicating the task set by the task setting section 112 is displayed in the selected task display region 1211 on the task setting screen 1200. FIG. 6 illustrates an example in which viewing and listening a documentary program (hereinafter, referred to as a task of a documentary program), taking out a light meal and eating and drinking it in a travel means during the itinerary (hereinafter, referred to as a task of a light meal), and viewing and listening a drama (hereinafter, referred to as a task of a drama) are set as tasks in the itinerary under planning by the task setting section 112. Then, the task of a documentary program, the task of a light meal, and the task of a drama are displayed as task icons 1211A to 1211C, respectively, in the selected task display region 1211. The present embodiment will be described on the assumption that these three tasks are set.

The order of tasks to be performed in the itinerary under planning may be the order of the icons of the tasks set (displayed) in the selected task display region 1211, and the order of these may be one that can be arbitrarily changed. Further, the icon of the task set (displayed) in the selected task display region 1211 can be arbitrarily deleted. Further, for the tasks to be performed in the itinerary under planning, a design in which they can be set such that a plurality of tasks are simultaneously performed instead of being performed one by one is possible.

The itinerary setting section 113 is a processing section that sets an itinerary serving as a candidate on the basis of the departure point, the arrival point, and the arrival time acquired by the input value acquisition section 111 and the task set by the task setting section 112. Specifically, the itinerary setting section 113 first uses the requirement information corresponding to tasks illustrated in FIG. 7 as a basis to define requirements corresponding to a task set by the task setting section 112. For example, as illustrated in FIG. 7, in the case where the task set by the task setting section 112 is a task of a light meal, the itinerary setting section 113 defines the requirements of "a paved road free from unevenness", "no congestion", and "good public order" as road requirements, the requirement of "a comfortable ride" as a vehicle type requirement, and the requirement of "no problem of allergies" as a user-specific requirement. Then, the itinerary setting section 113 transmits, to the navigation/traffic information service 20B via the communication section 14, the departure point, the arrival point, and the arrival time acquired by the input value acquisition section 111, information of the task set by the task setting section 112, and the defined requirements.

On the basis of the received information of the departure point, the arrival point, an intermediate point prescribed by a task, the execution time of a task, etc., the navigation/traffic information service 20B creates candidates for routes from the departure point to the arrival point via the intermediate point, as illustrated in FIG. 8. In this case, the navigation/traffic information service 20B uses a method like that illustrated in FIG. 9 to extract candidates for a store to stop by to execute the task of a light meal after the execution of the task of a documentary program. For example, it is assumed that a vehicle as a travel means runs in a range (allowable speed range) from a minimum speed of 30 [km/h] to a standard speed of 60 [km/h]. In the navigation/traffic information service 20B, a region reached after the execution of the task of a documentary program (the viewing and listening of a documentary program (for example, a length of 45 minutes)) starting from the departure point (a departure place icon 1701 illustrated in FIG. 9) is recognized as a region (a first region) between a minimum speed arrival line 1701A that is a line that can be reached at the minimum speed and a maximum speed arrival line 1701B that is a line that can be reached at the standard speed. Although in FIG. 9 the minimum speed arrival line 1701A and the maximum speed arrival line 1701B are indicated by arcs for simpler description, in practice these lines are lines taking account of the road. Further, in the navigation/traffic information service 20B, a region serving as a start point for arriving at the arrival point (an arrival place icon 1702 illustrated in FIG. 9) just after the execution of the task of a drama (the viewing and listening of a drama (for example, a length of 60 minutes)) is recognized as a region (a second region) between a minimum speed arrival line 1702A that is a line that can be reached at the minimum speed and a maximum speed arrival line 1702B that is a line that can be reached at the standard speed. Although in FIG. 9 the minimum speed arrival line 1702A and the maximum speed arrival line 1702B as well are indicated by arcs for simpler description, in practice these lines are lines taking account of the road. Then, the navigation/traffic information service 20B extracts stores existing in the region where the first region and the second region overlap (candidate store icons 1703A and 1703B illustrated in FIG. 9) as candidates for a store to stop by to execute the task of a light meal. That is, the navigation/traffic information service 20B extracts candidates for a store of a light meal that are reached in 45 minutes at a speed within the allowable speed range from the departure point and from which the arrival point is reached in 60 minutes at a speed within the allowable speed range. Note that the allowable speed range is, for example, a range having a legally permitted speed (for example, the standard speed described above) as an upper limit and a speed not interfering with the driving of the following vehicle (for example, the minimum speed described above) as a lower limit, a range of speeds at which the surrounding vehicles (for example, the front and rear vehicles) run, a speed range set by the user in advance, or the like.

Further, as illustrated in FIG. 8, on the basis of received requirements, the navigation/traffic information service 20B integrates map information corresponding to the requirements, such as a dangerous region map including information regarding a dangerous region, a non-pavement/unevenness map including information of an unpaved road, a paved road free from unevenness, etc., and a road congestion map including information of road congestion. Then, from among the created candidates for routes, the navigation/traffic information service 20B further selects candidates for routes that satisfy all the requirements indicated by the integrated map information. As above, the candidates for routes selected by the navigation/traffic information service 20B are created as candidates for an itinerary that satisfy the defined requirements and that include information of tasks. Then, the itinerary setting section 113 receives the created candidate for an itinerary from the navigation/traffic information service 20B via the communication section 14, and thereby sets candidates for an itinerary.

As another example of requirements defined on the basis of the requirement information corresponding to tasks illustrated in FIG. 7, there is an example in which in the case where the task is a task of a job, the requirements of "a paved road free from unevenness", "no congestion", and "good public order" are defined as road requirements and the requirements of "compatible with wireless fidelity (Wi-Fi)", "a comfortable ride", and "a desk (equipment of a substitute for a desk) is installed" are defined as vehicle type requirements. Further, in the case where the task is a task of sleep, the requirements of "a paved road free from unevenness", "no congestion", and "good public order" are defined as road requirements, and the requirements of "a comfortable ride" and "compatible with full flat" are defined as vehicle type requirements. Further, in the case where the task is a task of tourism, the requirements of "no congestion", "good scenery", and "good public order" are defined as road requirements. The requirement information corresponding to tasks illustrated in FIG. 7 may be information determined in advance, and may be information that can be arbitrarily set by the user.

Then, the display control section 130 causes an itinerary checking screen 1300 like that illustrated in FIG. 10 to display the candidates for an itinerary set by the itinerary setting section 113.

Further, the itinerary setting section 113 transmits, to the vehicle dispatch/automatic driving service 20C via the communication section 14, the vehicle type requirement among the defined requirements. The vehicle dispatch/automatic driving service 20C creates a list of vehicle types that satisfy the received vehicle type requirement, and transmits the list to the information processing apparatus 10. Then, the itinerary setting section 113 receives, from the vehicle dispatch/automatic driving service 20C via the communication section 14, the list of vehicle types that satisfy the vehicle type requirement.

The itinerary checking screen 1300 illustrated in FIG. 10 is a screen for displaying the candidates for an itinerary set by the itinerary setting section 113 and selecting and confirming an itinerary desired by the user. The itinerary checking screen 1300 is a screen displayed by the itinerary tab 1301 being selected from among the destination tab 1101, the way-of-spending-time tab 1201, and the itinerary tab 1301 described above. On the itinerary checking screen 1300 illustrated in FIG. 10, it is assumed that two candidates for an itinerary are set by the itinerary setting section 113, and a state where the contents of the candidate for an itinerary of "plan 1" out of them are displayed is illustrated. The itinerary checking screen 1300 includes, as illustrated in FIG. 10, an itinerary map display region 1302 and plan tabs 1311 and 1321.

The itinerary map display region 1302 is a region where routes of the candidates for an itinerary set by the itinerary setting section 113 are displayed on a map. In the example illustrated in FIG. 10, the itinerary map display region 1302 displays routes (candidate routes 1306A and 1306B) of two candidates for an itinerary for arriving at the arrival point (an arrival place icon 1304) from the departure point (a departure place icon 1303) via intermediate points (intermediate place icons 1305A and 1305B) that are two stores.

Plan tab 1311 is a tab for displaying the contents of the candidate for an itinerary of "plan 1" among the candidates for an itinerary set by the itinerary setting section 113. Plan tab 1321 is a tab for displaying the contents of the candidate for an itinerary of "plan 2" among the candidates for an itinerary set by the itinerary setting section 113. In the example of the itinerary checking screen 1300 illustrated in FIG. 10, plan tab 1311 is selected, and the contents of the candidate for an itinerary of "plan 1" are displayed; in this case, the itinerary checking screen 1300 further includes a vehicle dispatch icon 1312, task icons 1313 to 1315, editing buttons 1312A to 1315A, and a selection button 1316.

The vehicle dispatch icon 1312 is an icon indicating that the travel means in the candidate for an itinerary of "plan 1" is a vehicle capable of automatic driving. Beside the vehicle dispatch icon 1312, a description of the most recommended vehicle type (the vehicle type that satisfies the most vehicle type requirements) among icons of vehicle types received by the itinerary setting section 113 from the vehicle dispatch/automatic driving service 20C is displayed. Editing button 1312A is a button for changing the vehicle type given beside the vehicle dispatch icon 1312. The user can change the vehicle type to another vehicle type that satisfies the vehicle type requirement by pushing editing button 1312A.

Task icon 1313 is an icon indicating a task of a documentary program included in the candidate for an itinerary of "plan 1". Beside task icon 1313, for example, an outline of the documentary program indicated by task icon 1313, etc. are displayed. Editing button 1313A is a button for changing the documentary program indicated by task icon 1313 to another piece of content. The user can make a change to the viewing and listening of another piece of content by pushing editing button 1313A. Note that a design in which not only can a change be made to another piece of content but also the kind of the task can be changed is possible.

Task icon 1314 is an icon indicating a task of a light meal included in the candidate for an itinerary of "plan 1". Beside task icon 1314, for example, the contents of an order schedule of a light meal indicated by task icon 1314, etc. are displayed. Editing button 1314A is a button for changing the contents of an order schedule of a light meal indicated by task icon 1314. The user can change the contents of the order schedule to other contents by pushing editing button 1314A. Note that a design in which not only can the contents of an order schedule be changed to other contents but also whether to eat and drink a light meal at a store or take out a light meal can be changed is possible. The task of a light meal of the candidate for an itinerary of "plan 1" will be described on the assumption that it is, as described above, eating and drinking in a travel means (vehicle) by taking out.

Task icon 1315 is an icon indicating a task of a drama included in the candidate for an itinerary of "plan 1". Beside task icon 1315, for example, an outline of the drama indicated by task icon 1315, etc. are displayed. Editing button 1315A is a button for changing the drama indicated by task icon 1315 to another piece of content. Note that a design in which not only can a change be made to another piece of content but also the kind of the task can be changed is possible.

The selection button 1316 is a button for selecting a candidate for an itinerary selected by a tab (in FIG. 10, plan tab 1311 or 1321) from among one or more candidates for an itinerary set by the itinerary setting section 113, checking a rough estimate of the cost of the candidate for an itinerary, etc. When the selection button 1316 is pushed, the display control section 130 causes the manipulation display section 12 to display a cost rough estimate display screen 1300A like that illustrated in FIG. 11 that displays a rough estimate of the cost of the displayed candidate for an itinerary (in the example of FIG. 10, "plan 1"), etc.

The cost rough estimate display screen 1300A illustrated in FIG. 11 is a screen that displays a rough estimate of the cost of the selected candidate for an itinerary (herein, "plan 1"), etc. The cost rough estimate display screen 1300A includes, as illustrated in FIG. 11, an itinerary display region 1331, an itinerary map display region 1332, a cost rough estimate display region 1333, an insurance detail checking button 1334, and a confirmation button 1335.

The itinerary display region 1331 is a region where an outline of the itinerary of the selected candidate for an itinerary ("plan 1") is displayed. The itinerary map display region 1332 is a region where a route of the selected candidate for an itinerary is displayed on a map. The cost rough estimate display region 1333 is a region where a rough estimate of a cost that is expected to occur in the selected candidate for an itinerary is displayed. The insurance detail checking button 1334 is a button for checking or changing details of an insurance of which application to the selected candidate for an itinerary is proposed. The confirmation button 1335 is a button for confirming the selected candidate for an itinerary.

The insurance setting section 114 is a processing section that presents and sets an insurance applicable to a route, a vehicle type, and a task in the selected candidate for an itinerary. Specifically, when the selection button 1316 on the itinerary checking screen 1300 is pushed by the user, the insurance setting section 114 transmits, to the insurance service 20D via the communication section 14, user information of the user and information of the selected candidate for an itinerary. Upon receiving the user information and the information of the candidate for an itinerary, the insurance service 20D extracts insurances applicable to a route, a vehicle type, and a task in the candidate for an itinerary and creates a list, and transmits the list of insurances to the information processing apparatus 10. Then, the insurance setting section 114 receives the list of insurances from the insurance service 20D via the communication section 14. When the insurance detail checking button 1334 is pushed by the user, the display control section 130 causes the manipulation display section 12 to display detailed contents of the insurances extracted by the insurance service 20D as applicable to the selected candidate for an itinerary. For the contents of the insurances displayed by the display control section 130, application or non-application of an insurance, a change of the insurance to be applied, etc. can be performed by manipulations on the manipulation display section 12 by the user.

The final checking section 115 is a processing section that, when the confirmation button 1335 of the cost rough estimate display screen 1300A is pushed by the user, confirms the selected candidate for an itinerary and determines it as an itinerary plan. Specifically, when the confirmation button 1335 is pushed by the user, the final checking section 115 requests the vehicle dispatch/automatic driving service 200 to reserve necessary vehicle dispatch, requests the store service 20F to reserve taking out at the date and time indicated by the itinerary plan, requests the insurance service 20D to reserve enrollment in an insurance applied to the itinerary plan, and requests the bank service 20E to perform settlement-of-accounts processing of the payment of money necessary in advance before the execution of the itinerary plan. Note that the settlement-of-accounts processing of the payment of necessary money by the final checking section 115 may use points that can be used among services 20. For example, in an itinerary plan in a second embodiment described later, points obtained by home delivery business may be used for payment of a light meal.

The plan execution section 120 is a processing section that, in accordance with the itinerary plan confirmed (planned) by the planning section 110, performs execution management of each task included in the itinerary plan. The execution status, etc. of the itinerary plan executed by the plan execution section 120 are managed by, for example, a blockchain, and are fed back to the assessment of insurance and the change and adjustment of the itinerary plan. The plan execution section 120 is implemented by, for example, an application being executed by a CPU or an MPU. The plan execution section 120 includes, as illustrated in FIG. 3, a viewing/listening position acquisition section 121, a traffic information acquisition section 122, a driving information acquisition section 123, a prediction section 124, a speed change section 125, a neighborhood processing section 126, a measure setting section 127, and a plan change section 128.

The viewing/listening position acquisition section 121 is a processing section that, during the execution of a task of viewing and listening content such as music, a drama, a documentary program, news, or a movie included in the itinerary plan planned by the planning section 110, acquires the viewing/listening position of the content. Specifically, when the itinerary plan planned by the planning section 110 including, as described above, a task of a documentary program, a task of a light meal, and a task of a drama is being executed, the viewing/listening position acquisition section 121 transmits, during the execution of the task of a documentary program or the task of a drama, a viewing/listening position request for requesting the current viewing/listening position of the content to the content service 20A via the communication section 14. The content service 20A acquires the viewing/listening position of the content currently being provided in accordance with the received viewing/listening position request, and transmits the viewing/listening position to the information processing apparatus 10. Then, the viewing/listening position acquisition section 121 acquires, from the content service 20A via the communication section 14, the viewing/listening position of the content that is being viewed and listened by the user.

The traffic information acquisition section 122 is a processing section that, on the basis of the itinerary plan planned by the planning section 110, acquires traffic information such as traffic jam information on the route of the itinerary plan. Specifically, the traffic information acquisition section 122 transmits, to the navigation/traffic information service 20B via the communication section 14, the departure point, the arrival point, the arrival time, and route information in the itinerary plan planned by the planning section 110. On the basis of the received information of the departure point, the arrival point, the arrival time, and the route information, the navigation/traffic information service 20B aggregates traffic information including traffic jam information of the route indicated by the route information, accident occurrence situations, etc.; and the navigation/traffic information service 20B transmits the aggregation to the information processing apparatus 10. Then, the traffic information acquisition section 122 acquires the traffic information on the route of the itinerary plan from the navigation/traffic information service 20B via the communication section 14.

The driving information acquisition section 123 is a processing section that, during travel with a vehicle that can be automatically driven as a travel means (hereinafter, it may be simply referred to as an automatic driving vehicle) during the execution of the itinerary plan planned by the planning section 110, acquires information of the current speed, the current remaining amount of fuel, etc. of the vehicle. Specifically, during travel with an automatic driving vehicle, the driving information acquisition section 123 transmits, to the vehicle dispatch/automatic driving service 20C via the communication section 14, a driving information request that requests information regarding the vehicle (the speed, the remaining amount of fuel, etc.). In accordance with the received driving information request, the vehicle dispatch/automatic driving service 20C collects, as driving information, information of the speed, the remaining amount of fuel, etc. of the vehicle of interest; and the vehicle dispatch/automatic driving service 20C transmits the driving information to the information processing apparatus 10. Then, the driving information acquisition section 123 acquires the driving information regarding the currently traveling vehicle from the vehicle dispatch/automatic driving service 20C via the communication section 14.

The prediction section 124 is a processing section that predicts whether or not a task of the itinerary plan planned by the planning section 110 will end just at the time of arrival at the start point of the next task or at a target point that is supposed to be reached when the task currently being executed ends (for example, arrival at an intermediate point serving as the start point of the next task). Such prediction by the prediction section 124 is based on the fact that the user may perform a manipulation such as fast-forwarding, rewinding, or pausing during the viewing and listening of content. Specifically, for example, a case will now be considered where the three tasks described above (a task of a documentary program, a task of a light meal, and a task of a drama) are included in the itinerary plan planned by the planning section 110 and among these the task of a documentary program is being executed. In this case, the prediction section 124 predicts whether the viewing and listening of the documentary program will end just at the time of arrival at a store of a light meal for the next task of a light meal or not on the basis of the viewing/listening position of the documentary program acquired by the viewing/listening position acquisition section 121, the traffic information acquired by the traffic information acquisition section 122, and the driving information acquired by the driving information acquisition section 123.

The speed change section 125 is a processing section that performs, on the prediction result of the prediction section 124, the processing of changing the speed of the automatic driving vehicle as a travel means. For example, the speed change section 125 lowers the speed of the vehicle when, according to the prediction section 124, the viewing/listening position of the documentary program is behind schedule, and raises the speed of the vehicle when the viewing/listening position is ahead of schedule or when, according to the traffic information described above, a traffic jam has occurred and the arrival is likely to be delayed. Note that, in the case where the travel means is not an automatic driving vehicle but a vehicle manually driven by a driver, which is not an automatic driving vehicle, a vehicle semi-automatically driven, a share car, a taxi, or the like, the speed change section 125 may instruct the driver (including the user) of the travel means to change the speed of the travel means in accordance with the prediction result of the prediction section 124.

The neighborhood processing section 126 is a processing section that, when the travel means has reached the neighborhood of the next target point (an intermediate point or the arrival point) (for example, when the travel means has reached an area within a predetermined distance to the target point), transmits a processing request to the service 20 as processing contributing to the task currently being executed or processing for preparation for the next task. For example, during the execution of the task of a documentary program like above, when the automatic driving vehicle has reached the neighborhood of a store of a light meal for the task of a light meal, the neighborhood processing section 126 transmits, to the store service 20F via the communication section 14, a light meal preparation request that requests the store to prepare a light meal. When the light meal preparation request is received by the store service 20F, the staff of the store related to the store service 20F prepares a specified light meal in accordance with the light meal preparation request.

The measure setting section 127 is a processing section that, when the speed change section 125 has inferred that it is necessary to increase or decrease the speed of the automatic driving vehicle and the speed after change deviates from the allowable speed range, creates a list of measure proposals (a measure list) that can be presented and sets a measure proposal selected by the user from among the created measure proposals. For example, during the execution of a task, when the speed change section 125 has decided that if the speed of the automatic driving vehicle is raised, the speed deviates from the allowable speed range, the measure setting section 127 creates a list of measure proposals (a measure list) that can be presented, like that illustrated in FIG. 12. The list of measure proposals illustrated in FIG. 12 includes measure proposals (1) to (5) as examples of measure proposals.

Measure proposal (1) is a proposal to, in order to raise the speed of the automatic driving vehicle, change the route to a route on which speeds outside the allowable speed range can be used. For example, the measure setting section 127 presents, as measure proposal (1), a proposal to change the route to a route using an expressway. In this case, neither excess time nor a change in the contents of the task occurs, but an additional fee (an expressway fee) occurs.

Measure proposal (2) is a proposal to change the travel means by incorporating use of mobility capable of traveling at a speed higher than speeds within the allowable speed range of the automatic driving vehicle. For example, the measure setting section 127 presents, as measure proposal (2), a proposal to use an automatic driving vehicle, that is, use a railway such as a limited express train or the Shinkansen. In this case, neither excess time nor a change in the contents of the task occurs, but an additional fee (a railway fee, a limited express fee, or the like) occurs.

Measure proposal (3) is a proposal to reduce the number of places to stop by (intermediate points) in the itinerary plan to reduce the number of tasks. For example, during the execution of the task of a documentary program as above, the measure setting section 127 presents a proposal to skip the task of a light meal, which is the next task, that is, not stop by a store for a light meal (a cafe or the like). In this case, neither excess time nor an additional fee occurs, but the way of spending time in the itinerary plan is changed due to the reduction in the number of tasks.

Measure proposal (4) is a proposal to adjust the task by adjusting the service contents of the task currently being executed. For example, the measure setting section 127 presents a proposal to, in the task of a light meal, which is the next task after the task of a documentary program described above, abandon stopping by a store (cafe) for taking out a light meal and switch to delivery of the store and receive a light meal on the way of the itinerary. In this case, neither excess time nor a change in the task occurs, but an additional fee (a delivery fee) occurs.

Measure proposal (5) is a proposal to prioritize a task, such as to allow a delay in the completion of the task currently being executed and add a new task for a length of time equal to the delay time. For example, during the execution of the task of a documentary program, when the vehicle runs at the maximum speed (standard speed) of the automatic driving vehicle, the measure setting section 127 presents a proposal to add a task of viewing and listening new content for a length of time equal to the time from the end of the viewing and listening of the documentary to the arrival at the intermediate place (store) of the task of a light meal.

The measure proposals presented by the measure setting section 127 are not limited to the proposals illustrated in FIG. 12. For example, a measure proposal to simply allow a delay in the completion of the task currently being executed may be presented instead of or in addition to the proposals illustrated in FIG. 12.

The list of measure proposals created and presented by the measure setting section 127 may be set in advance in accordance with the user's preference.

The plan change section 128 is a processing section that changes the itinerary plan on the basis of a measure proposal set by the measure setting section 127. For example, in accordance with a measure proposal set by the measure setting section 127, the plan change section 128 requests the vehicle dispatch/automatic driving service 20C to change the route, requests the store service 20F to change a reservation for taking out (cancellation, reception by delivery, or the like), and notifies the insurance service 20D of a change in the contents of insurance.

The display control section 130 is a processing section that controls operations based on the display function of the manipulation display section 12. The display control section 130 is implemented by, for example, a program (an application or the like) being executed by a CPU or an MPU.

The detection result acquisition section 140 is a processing section that acquires a detection result detected by the sensor section 15. The detection result acquisition section 140 is implemented by, for example, a program (an application or the like) being executed by a CPU or an MPU.

The manipulation display section 12 is, for example, a touch panel or the like, and is a device that accepts an input to the control section 11 (an input function) and displays the operation contents of the application executed by the control section 11, etc. (a display function).

The storage section 13 is a device that stores various data and programs (a program of an application, etc.). The storage section 13 is, for example, a semiconductor memory such as a random access memory (RAM) or a flash memory, a hard disk, an optical disk, or the like.

The communication section 14 is a processing section that performs data communication with various services 20 via the network N. The communication section 14 performs data communication in accordance with, for example, a wireless local area network (LAN) standard such as Wi-Fi.

The sensor section 15 is, for example, a voice input device (a microphone), an imaging device that captures an image, any of various sensors that perform biological sensing, or the like.

Some or all of the processing sections implemented by the execution of software (a program) in the control section 11 illustrated in FIG. 3 may be implemented by a hardware circuit such as a field-programmable gate array (FPGA) or an ASIC.

The processing sections of the control section 11 illustrated in FIG. 3 conceptually illustrate functions, and the configuration is not limited to such a configuration. For example, a plurality of processing sections illustrated as independent processing sections in the control section 11 illustrated in FIG. 3 may be configured as one processing section. On the other hand, in the control section 11 illustrated in FIG. 3, the processing contents of one processing section may be divided into a plurality of pieces, and a plurality of processing sections may be configured.

(1-3. Itinerary Planning Processing of Information Processing Apparatus According to First Embodiment)

Figure 13A:
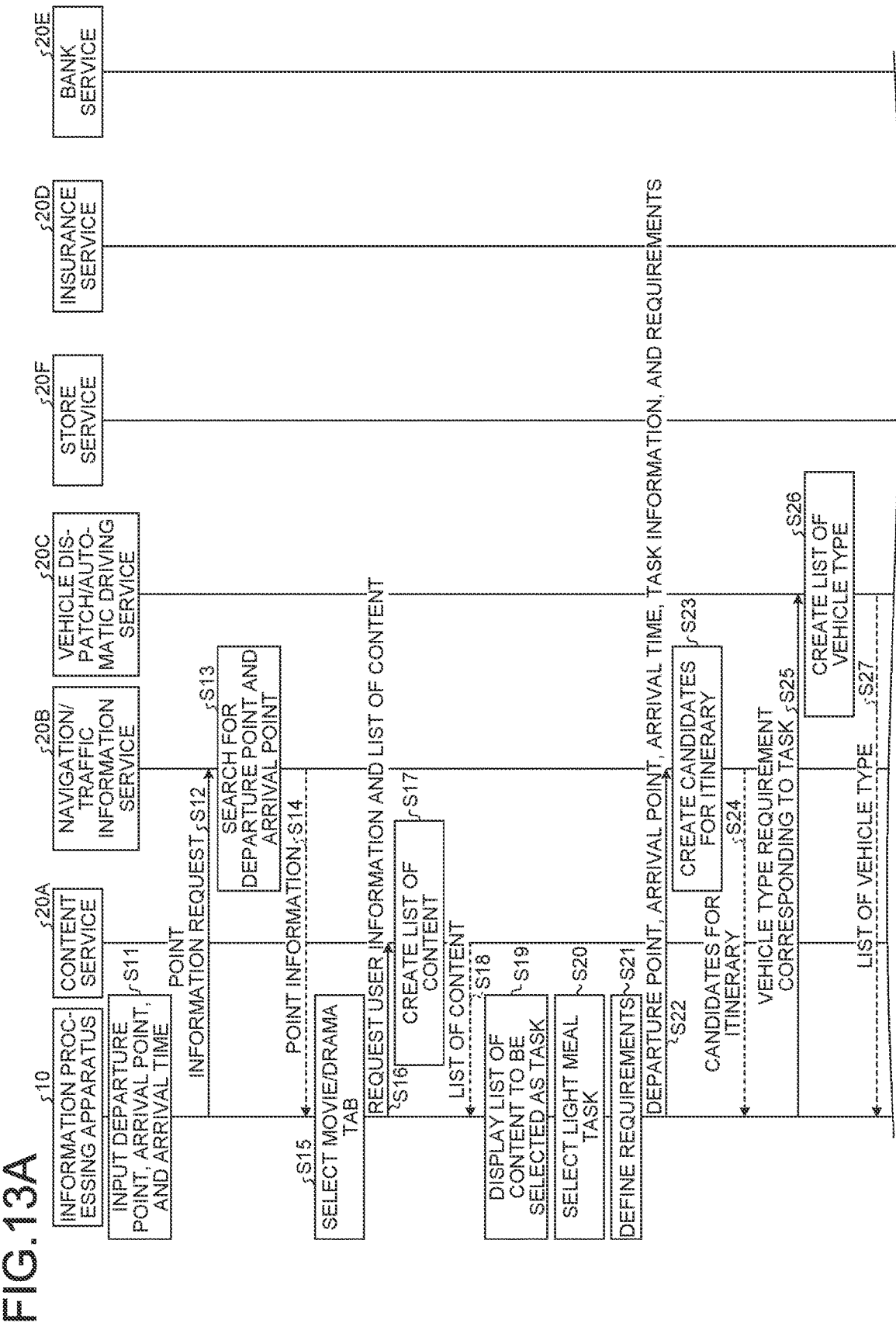
FIG. 13A is a sequence diagram illustrating an example of a flow of itinerary planning processing of the information processing apparatus according to the first embodiment.
Figure 13B:
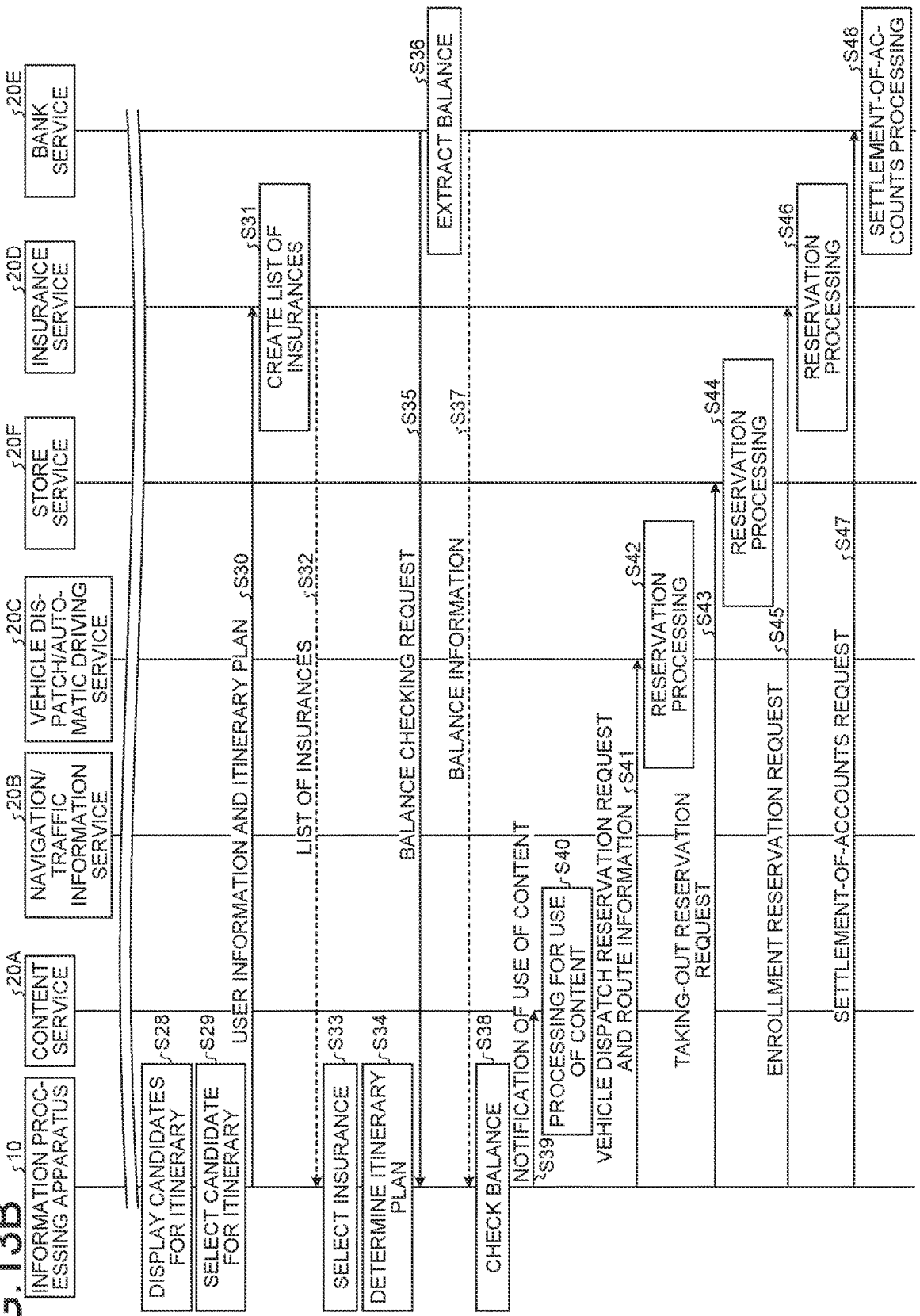
FIG. 13B is a sequence diagram illustrating an example of a flow of itinerary planning processing of the information processing apparatus according to the first embodiment.

FIGS. 13A and 13B are sequence diagrams illustrating an example of a flow of itinerary planning processing of the information processing apparatus according to the first embodiment. A flow of itinerary planning processing of the information processing apparatus 10 according to the present embodiment will now be described with reference to FIGS. 13A and 13B. Processing contents will now be described for each step number written in FIGS. 13A and 13B.

Step S11

When the new creation button 1001 of the new itinerary creation screen 1000 illustrated in FIG. 4 is pushed by the user, the display control section 130 causes the manipulation display section 12 to display the point/time input screen 1100 illustrated in FIG. 5. Then, the user inputs a departure point, an arrival point, and an arrival time of an itinerary under planning to the departure place input region 1102, the arrival place input region 1103, and the arrival time input region 1105 of the point/time input screen 1100, respectively. Then, the input value acquisition section 111 of the planning section 110 acquires the departure point, the arrival point, and the arrival time inputted on the point/time input screen 1100.

Step S12

Then, the input value acquisition section 111 transmits, to the navigation/traffic information service 20B via the communication section 14, a point information request that requests the positions of the departure point and the arrival point, together with the acquired information of these points.

Steps S13 and S14

Upon receiving the point information request, the navigation/traffic information service 20B searches for the departure point and the arrival point, and transmits, to the information processing apparatus 10, point information including information of the positions of both points. When the point information is received by the input value acquisition section 111 via the communication section 14, the display control section 130 of the planning section 110 uses the point information as a basis to cause the map display region 1106 of the point/time input screen 1100 to display map information including an icon indicating the departure point and an icon indicating the arrival point.

Steps S15 and S16

Then, when the way-of-spending-time tab 1201 of the point/time input screen 1100 is selected by the user, the display control section 130 causes the task setting screen 1200 to be displayed. Then, when the movie/drama tab 1202 is selected, the task setting section 112 transmits, to the content service 20A via the communication section 14, a content list request that requests user information of the user and a list of content.

Steps S17 and S18

Upon receiving the content list request, the content service 20A extracts, for example, content matching the user's preference specified by the received user information, and transmits a list of extracted content to the information processing apparatus 10.

Step S19

When the list of content is received by the task setting section 112 via the communication section 14, the display control section 130 causes the task setting screen 1200 illustrated in FIG. 6 to display content icons 1202A as icons indicating pieces of content of the list. Then, when an icon of content to be viewed and listened in a travel means is selected by the user from the list of content icons 1202A of various pieces of content, the task setting section 112 sets, as a task in the itinerary under planning, the viewing and listening of the content indicated by the selected icon. Herein, a description is given on the assumption that a task of a documentary program and a task of a drama (after a task of a light meal described later) are set by the task setting section 112.

Step S20

Further, when the light meal tab 1205 of the task setting screen 1200 is selected by the user, the display control section 130 causes the task setting screen 1200 to display a list of stores for eating and drinking or taking out a light meal. Then, when a store for taking out is selected by the user from the list of stores, the task setting section 112 sets, as a task in the itinerary under planning, the taking-out of a light meal at the selected store. The following description is given on the assumption that finally a task of a documentary program, a task of a light meal, and a task of a drama are set in this order by the task setting section 112.

Step S21

Next, on the basis of the requirement information corresponding to tasks illustrated in FIG. 7, the itinerary setting section 113 of the planning section 110 defines requirements corresponding to the tasks set by the task setting section 112 (for example, road requirements, vehicle type requirements, and user-specific requirements).

Step S22

Then, the itinerary setting section 113 transmits, to the navigation/traffic information service 20B via the communication section 14, the departure point, the arrival point, and the arrival time acquired by the input value acquisition section 111, information of the task set by the task setting section 112, and the defined requirements.

Steps S23 and S24

On the basis of the received information of the departure point, the arrival point, an intermediate point prescribed by a task, the execution time of a task, etc., the navigation/traffic information service 20B creates candidates for routes from the departure point to the arrival point via the intermediate point, as illustrated in FIG. 8. In this case, the navigation/traffic information service 20B uses a method like that illustrated in FIG. 9 to extract candidates for a store to stop by to execute the task of a light meal after the execution of the task of a documentary program. Further, as illustrated in FIG. 8, on the basis of received requirements, the navigation/traffic information service 20B integrates map information corresponding to the requirements, such as a dangerous region map including information regarding a dangerous region, a non-pavement/unevenness map including information of an unpaved road, a paved road free from unevenness, etc., and a road congestion map including information of road congestion. Then, from among the created candidates for routes, the navigation/traffic information service 20B further selects candidates for routes that satisfy all the requirements indicated by the integrated map information. As a result, the candidates for routes selected by the navigation/traffic information service 20B are created as candidates for an itinerary that satisfy the defined requirements and that include information of tasks. Then, the itinerary setting section 113 receives the created candidate for an itinerary from the navigation/traffic information service 20B via the communication section 14, and thereby sets candidates for an itinerary.

Step S25

Further, the itinerary setting section 113 transmits, to the vehicle dispatch/automatic driving service 20C via the communication section 14, the vehicle type requirement among the defined requirements.

Steps S26 and S27

The vehicle dispatch/automatic driving service 20C creates a list of vehicle types that satisfy the received vehicle type requirement, and transmits the list to the information processing apparatus 10. Then, the itinerary setting section 113 receives, from the vehicle dispatch/automatic driving service 20C via the communication section 14, the list of vehicle types that satisfy the vehicle type requirement, and incorporates the list to the set candidate for an itinerary.

Step S28

Then, the display control section 130 causes an itinerary checking screen 1300 like that illustrated in FIG. 10 to display the candidates for an itinerary set by the itinerary setting section 113.

Steps S29 and S30

Then, the user selects a desired candidate for an itinerary from among the candidates for an itinerary set by the itinerary setting section 113 on the itinerary checking screen 1300. Herein, it is assumed that, as illustrated in FIG. 10, "plan 1" and "plan 2" are set by the itinerary setting section 113, out of these the candidate for an itinerary of "plan 1" is selected by the user, and the selection button 1316 is pushed. Then, the display control section 130 causes the manipulation display section 12 to display a cost rough estimate display screen 1300A like that illustrated in FIG. 11, which displays a rough estimate of the cost, etc. of the displayed candidate for an itinerary of "plan 1". Then, the insurance setting section 114 of the planning section 110 transmits, to the insurance service 20D via the communication section 14, user information of the user and information of the selected candidate for an itinerary of "plan 1".

Steps S31 and S32

Upon receiving the user information and the information of the candidate for an itinerary, the insurance service 20D extracts insurances applicable to a route, a vehicle type, and a task in the candidate for an itinerary and creates a list, and transmits the list of insurances to the information processing apparatus 10. Then, the insurance setting section 114 receives the list of insurances from the insurance service 20D via the communication section 14.

Step S33

When the insurance detail checking button 1334 of the cost rough estimate display screen 1300A is pushed by the user, the display control section 130 causes the manipulation display section 12 to display detailed contents of the insurances extracted by the insurance service 20D as applicable to the selected candidate for an itinerary. When a desired selection is made by the user regarding application or non-application of an insurance, a change of the insurance to be applied, etc., the insurance setting section 114 sets the selected insurance as an insurance applied to the selected candidate for an itinerary.

Step S34

Then, when the confirmation button 1335 of the cost rough estimate display screen 1300A is pushed by the user, the final checking section 115 confirms the selected candidate for an itinerary, and determines it as an itinerary plan.

Step S35

Then, the final checking section 115 of the planning section 110 transmits, to the bank service 20E via the communication section 14, a balance checking request for requesting the balance of a bank account of the user.

Steps S36 and S37

The bank service 20E extracts balance information of the corresponding bank account of the user in accordance with the received balance checking request, and transmits the balance information to the information processing apparatus 10.

Step S38

Then, the final checking section 115 receives the balance information from the bank service 20E via the communication section 14, and checks the balance of the bank account of the user.

Steps S39 and S40

Further, the final checking section 115 transmits, to the content service 20A via the communication section 14, a notification of use of necessary content for the tasks included in the confirmed itinerary plan. Upon receiving the notification of use of content, the content service 20A performs processing for use of the necessary content, such as setting a reservation for distribution of the content at the date and time of use.

Steps S41 and S42

Further, the final checking section 115 transmits, to the vehicle dispatch/automatic driving service 20C via the communication section 14, route information included in the confirmed itinerary plan and a vehicle dispatch reservation request regarding the vehicle type. Upon receiving the route information and the vehicle dispatch reservation information, the vehicle dispatch/automatic driving service 20C performs use reservation processing based on the route information for a vehicle of the designated vehicle type (herein, an automatic driving vehicle).

Steps S43 and S44

Further, in order to execute the task of a light meal included in the confirmed itinerary plan, the final checking section 115 transmits, to the store service 20F via the communication section 14, a taking-out reservation request for requesting a reservation for taking-out of a light meal at the date and time indicated by the itinerary plan. Upon receiving the taking-out reservation request, the store service 20F performs the processing of reserving the taking-out of a light meal at the designated date and time.

Steps S45 and S46

Further, the final checking section 115 transmits, to the insurance service 20D via the communication section 14, an enrollment (application) reservation request regarding the insurance determined in step S33. Upon receiving the enrollment reservation request, the insurance service 20D performs the processing of reserving enrollment in the designated insurance.

Steps S47 and S48

Then, the final checking section 115 transmits, to the bank service 20E via the communication section 14, a settlement-of-accounts request regarding the payment of money necessary before the execution of the confirmed itinerary plan. Upon receiving the settlement-of-accounts request, the bank service 20E performs settlement-of-accounts processing regarding the payment of money necessary before the execution of the itinerary plan.

The flow of itinerary planning processing of the information processing apparatus 10 illustrated in FIGS. 13A and 13B are examples, and the itinerary planning processing is not limited to this flow. For example, the order of the processing of the steps illustrated in FIGS. 13A and 13B are not limited; for example, the processing of steps S41 and S42, steps S43 and S44, steps S45 and S46, and steps S47 and S48 may be in any order. Further, for example, in the case where the itinerary under planning does not include a task of viewing and listening content, the processing of acquiring a content list is not necessary for the processing of steps S16 to S18.

(1-4. Plan Execution Processing of Information Processing Apparatus According to First Embodiment)

FIG. 14 is a sequence diagram illustrating an example of a flow of plan execution processing of the information processing apparatus according to the first embodiment. An example of a flow of plan execution processing of the information processing apparatus 10 according to the present embodiment is described with reference to FIG. 14. Note that, in FIG. 14, a description is given focusing on the operation of executing the task of a documentary program in the itinerary plan confirmed by FIG. 13A and FIG. 13B described above, which includes the task of a documentary program, the task of a light meal, and the task of a drama. Processing contents will now be described for each step number written in FIG. 14.

Step S61

When an automatic driving vehicle for which a use reservation has been made in advance by the final checking section 115 is dispatched, the user gets in the automatic driving vehicle. Then, by a manipulation on the manipulation display section 12 by the user, the plan execution section 120 starts the execution of the itinerary plan confirmed by the final checking section 115 of the planning section 110. Thereby, the automatic driving vehicle starts running in accordance with the itinerary plan.

Step S62

During the execution of the task of viewing and listening a documentary program as content included in the itinerary plan planned by the planning section 110, the viewing/listening position acquisition section 121 of the plan execution section 120 transmits, to the content service 20A via the communication section 14, a viewing/listening position request for requesting the viewing/listening position of the documentary program.

Steps S63 and S64

Upon receiving the viewing/listening position request, the content service 20A acquires the viewing/listening position of the documentary program that is content currently being provided, and transmits the viewing/listening position to the information processing apparatus 10. Then, the viewing/listening position acquisition section 121 acquires, from the content service 20A via the communication section 14, the viewing/listening position of the content that is being viewed and listened by the user.

Step S65

Next, the traffic information acquisition section 122 of the plan execution section 120 transmits, to the navigation/traffic information service 20B via the communication section 14, the departure point, the arrival point, the arrival time, and the route information in the itinerary plan planned by the planning section 110.

Steps S66 and S67

On the basis of the received information of the departure point, the arrival point, the arrival time, and the route information, the navigation/traffic information service 20B aggregates traffic information including traffic jam information of the route indicated by the route information, accident occurrence situations, etc.; and the navigation/traffic information service 20B transmits the aggregation to the information processing apparatus 10. Then, the traffic information acquisition section 122 acquires the traffic information on the route of the itinerary plan from the navigation/traffic information service 20B via the communication section 14.

Step S68

Next, during travel with the automatic driving vehicle, the driving information acquisition section 123 of the plan execution section 120 transmits, to the vehicle dispatch/automatic driving service 20C via the communication section 14, a driving information request that requests information regarding the vehicle (the speed, the remaining amount of fuel, etc.).

Steps S69 and S70

In accordance with the received driving information request, the vehicle dispatch/automatic driving service 20C acquires, as driving information, information of the speed, the remaining amount of fuel, etc. of the vehicle of interest; and the vehicle dispatch/automatic driving service 20C transmits the driving information to the information processing apparatus 10. Then, the driving information acquisition section 123 acquires the driving information regarding the currently traveling vehicle from the vehicle dispatch/automatic driving service 20C via the communication section 14.

Step S71

Next, the prediction section 124 of the plan execution section 120 predicts whether or not the task of a documentary program will end just at the time of arrival at the start point of the task of a light meal that is the next task (a target point that is supposed to be reached when the task of a documentary program currently being executed ends) (arrival at an intermediate point serving as the start point of the task of a light meal). Specifically, the prediction section 124 predicts whether the viewing and listening of the documentary program will end just at the time of arrival at a store of a light meal for the next task of a light meal or not on the basis of the viewing/listening position of the documentary program acquired by the viewing/listening position acquisition section 121, the traffic information acquired by the traffic information acquisition section 122, and the driving information acquired by the driving information acquisition section 123. For example, the prediction section 124 can make a prediction by finding the point of the automatic driving vehicle at the time of the end of the documentary program as content.

Step S72

Next, the speed change section 125 of the plan execution section 120 infers whether an adjustment in the speed of the automatic driving vehicle is unnecessary or not on the basis of whether, according to the prediction section 124, the viewing/listening position of the documentary program is behind schedule or not. In the case where an adjustment in speed is unnecessary (step S72: Yes), the procedure proceeds to step S81, and in the case where an adjustment in speed is necessary (step S72: No), the procedure proceeds to step S73.

Step S73

The speed change section 125 decides whether the viewing/listening position of the documentary program is behind schedule or not by means of the prediction section 124. In the case where the viewing/listening position of the documentary program is ahead of schedule or in the case where, according to the traffic information described above, the arrival is likely to be delayed due to the occurrence of a traffic jam (step S73: No), the procedure proceeds to step S74, and in the case where the viewing/listening position of the documentary program is behind schedule (step S73: Yes), the procedure proceeds to step S75.

Step S74

The speed change section 125 raises the target speed of the automatic driving vehicle. Here, the target speed is a target speed to which the speed should be changed from the current speed in the running control of the automatic driving vehicle. For example, the speed change section 125 may set, as a target speed, a speed obtained by adding a predetermined amount to the current speed of the automatic driving vehicle.

Step S75

The speed change section 125 lowers the target speed of the automatic driving vehicle. For example, the speed change section 125 may set, as a target speed, a speed obtained by subtracting a predetermined amount to the current speed of the automatic driving vehicle.

Step S76

The speed change section 125 decides whether the target speed after change is within the allowable speed range or not. In the case where the speed is within the allowable speed range (step S76: Yes), the procedure proceeds to step S77, and in the case where the speed is outside the allowable speed range (step S76: No), the procedure proceeds to step S78.

Step S77

The prediction section 124 decides whether, when the automatic driving vehicle runs at the target speed after changed by the speed change section 125, the predicted point of the automatic driving vehicle at the time of the end of the documentary program is just the intermediate point of the task of a light meal or not. In the case where the predicted point is just the intermediate point of the task of a light meal (step S77: Yes), the procedure proceeds to step S79, and in the case where the predicted point is not the intermediate point of the task of a light meal (step S77: No), the process returns to step S73.

Step S78

Figure 15:
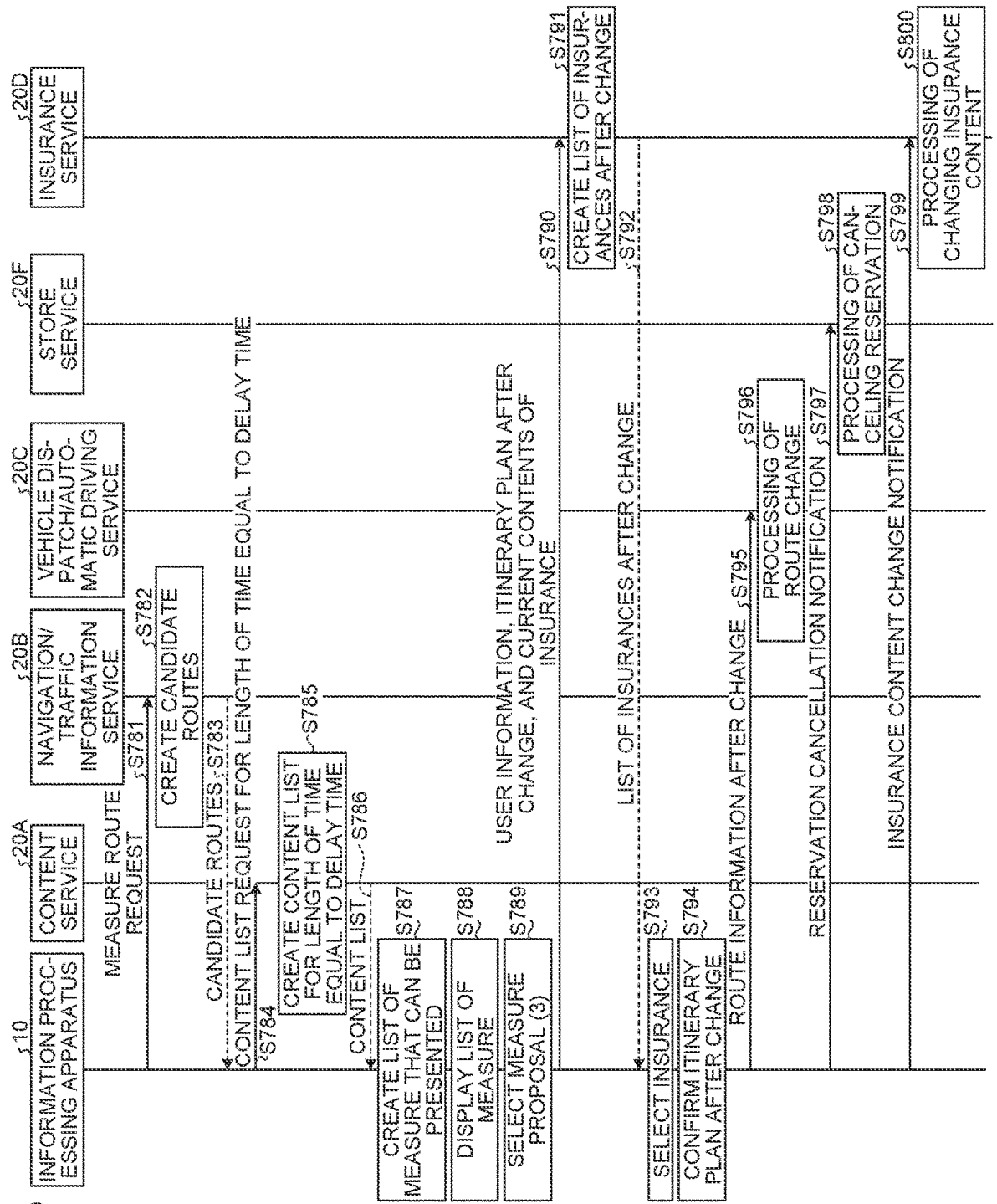
FIG. 15 is a sequence diagram illustrating an example of a flow of plan change processing in plan execution processing of the information processing apparatus according to the first embodiment.

When the target speed after changed by the speed change section 125 is outside the allowable speed range, the plan execution section 120 infers that handling by speed adjustment is impossible, and executes itinerary change processing illustrated in FIG. 15 described later. The itinerary change processing will be described in detail in FIG. 15 described later.

Steps S79 and S80

The speed change section 125 transmits, to the vehicle dispatch/automatic driving service 20C via the communication section 14, a speed change request for requesting a change to the calculated target speed, together with changed speed information that is information of the target speed. Upon receiving the changed speed information and the speed change request, the vehicle dispatch/automatic driving service 20C executes, on the automatic driving vehicle in which the user of the information processing apparatus 10 is riding, speed change processing of changing the speed to the speed indicated by the changed speed information by means of an operating command by wireless communication. Then, the procedure proceeds to step S81.

Step S81

Next, the neighborhood processing section 126 of the plan execution section 120 decides whether the automatic driving vehicle has reached the neighborhood of the intermediate point (store) of the task of a light meal that is the next task or not (for example, whether the travel means has reached an area within a predetermined distance to the target point or not). In the case of having reached the neighborhood (step S81: Yes), the neighborhood processing section 126 transmits, to the store service 20F via the communication section 14, a light meal preparation request that requests the store that is the intermediate point to prepare a light meal. Then, the procedure proceeds to step S82.

On the other hand, in the case of not having reached the neighborhood yet (step S81: No), the procedure proceeds to step S83.

Step S82

When the light meal preparation request is received by the store service 20F, the staff of the store related to the store service 20F prepares a specified light meal in accordance with the light meal preparation request. Then, the procedure proceeds to step S83.

Step S83

The plan execution section 120 decides whether the task of a documentary program has ended or not, that is, whether the viewing and listening of the documentary program has ended and the vehicle has arrived at the intermediate place (store) of the next task of a light meal or not. In the case where the task of a documentary program has ended (step S83: Yes), the next task is executed, and in the case where the task of a documentary program has not ended (step S83: No), the procedure returns to step S62, and the processing of steps S62 to S83 is repeated in the information processing apparatus 10 until the vehicle arrives at the intermediate place (store) of the task of a light meal.

Next, a flow of plan change processing (step S78 of FIG. 14) in plan execution processing of the information processing apparatus 10 according to the present embodiment is described with reference to FIG. 15. FIG. 15 is a sequence diagram illustrating an example of a flow of plan change processing in plan execution processing of the information processing apparatus according to the first embodiment. Processing contents will now be described for each step number written in FIG. 15.

Step S781

In the case where it is decided in FIG. 14 described above that the target speed after changed by the speed change section 125 is outside the allowable speed range, the measure setting section 127 of the plan execution section 120 transmits, to the navigation/traffic information service 20B via the communication section 14, a measure route request for requesting candidates for routes to which a change is made in the case of, for example, handling by measure proposals illustrated in FIG. 12.

Steps S782 and S783

Upon receiving the measure route request, the navigation/traffic information service 20B transmits, to the information processing apparatus 10, candidates for routes (candidate routes) corresponding to the measure proposals indicated by the measure route request.

Step S784

A case where measure proposal (5) is selected from among the measure proposals illustrated in FIG. 12 will now be supposed; when the vehicle runs at the maximum speed (standard speed) of the automatic driving vehicle, the measure setting section 127 transmits, to the content service 20A via the communication section 14, a content list request for requesting a list of content for new viewing and listening for a length of time equal to the delay time from the end of the viewing and listening of the documentary to the arrival at the intermediate place (store) of the task of a light meal.

Steps S785 and S786

Upon receiving the content list request, the content service 20A extracts content corresponding to a length of time equal to the delay time described above and creates a list, and transmits the list to the information processing apparatus 10.

Steps S787 and S788

The measure setting section 127 creates a list of measure proposals (a measure list) that can be presented to the user on the basis of the candidate routes received from the navigation/traffic information service 20B, the list of new content received from the content service 20A, etc. Then, the display control section 130 causes the manipulation display section 12 to display the measure list created by the measure setting section 127.

Step S789

Here, it is assumed that the user has selected measure proposal (3) described above from the measure list displayed on the manipulation display section 12. Then, the measure setting section 127 sets measure proposal (3) selected by the user as a measure proposal to be reflected in the itinerary plan.

Step S790

Then, the insurance setting section 114 transmits, to the insurance service 20D via the communication section 14, user information of the user, an itinerary plan after changed on the basis of measure proposal (3) set by the measure setting section 127, and the current contents of insurance.

Steps S791 and S792

Upon receiving the user information, the itinerary plan after change, and the current contents of insurance, the insurance service 20D extracts insurances that can be used as alterations to or newly applied to a route, a vehicle type, and a task in the itinerary plan after change and creates a list, and transmits the list of insurances to the information processing apparatus 10. Then, the insurance setting section 114 receives the list of insurances from the insurance service 20D via the communication section 14.

Step S793

The display control section 130 causes the manipulation display section 12 to display the list of insurances received by the insurance setting section 114. When a desired selection is made by the user for the change of insurance or the like, the insurance setting section 114 sets the selected insurance as an insurance applied to the selected itinerary plan.

Step S794

Then, the plan change section 128 of the plan execution section 120 changes and confirms the itinerary plan on the basis of the measure proposal set by the measure setting section 127 and the contents of the insurance set by the insurance setting section 114.

Steps S795 and S796

Further, the plan change section 128 transmits, to the vehicle dispatch/automatic driving service 20C via the communication section 14, route information of the itinerary plan after change. Upon receiving the route information of the itinerary plan after change, the vehicle dispatch/automatic driving service 20C performs the processing of route change on the basis of the route information.

Steps S797 and S798

Further, the plan change section 128 transmits, to the store service 20F via the communication section 14, a reservation cancellation notification for canceling a reservation for taking out reserved for the task of a light meal. Upon receiving the reservation cancellation notification, the store service 20F performs the processing of canceling the reservation for taking out.

Steps S799 and S800

Further, the plan change section 128 transmits, to the insurance service 20D via the communication section 14, an insurance content change notification for change to the contents of the insurance selected in step S793. Upon receiving the insurance content change notification, the insurance service 20D performs the processing of change to the contents of the designated insurance.

The flow of plan execution processing of the information processing apparatus 10 illustrated in FIG. 14 is an example, and the plan execution processing is not limited to this flow. For example, the order of the processing of the steps illustrated in FIG. 14 is not limited; for example, the processing of steps S62 to S64, steps S65 to S67, and steps S68 to S70 may be in any order. Further, for example, in the execution of a task of a job, the plan execution section 120 may, in the execution of the itinerary plan, change the speed of the travel means such that the time of the set job ends at the time of arrival at the start point of the next task.

(1-5. Effects of Information Processing Apparatus According to First Embodiment)

As described above, in the information processing apparatus 10 (information processing apparatus) according to the present embodiment, the task setting section 112 (a setting section) sets one or more tasks that are scheduled to be executed during travel from a departure point to an arrival point of an itinerary, the itinerary setting section 113 and the final checking section 115 (a determination section) determine, on the basis of the departure point, the arrival point, and the one or more tasks, an itinerary plan including one or more travel means from the departure point to the arrival point and a task that is scheduled to be executed during travel with each of the travel means, the prediction section 124 (a prediction section) predicts whether or not a task performed during execution of the itinerary plan will end before arrival of the travel means at a target point that is supposed to be reached when the task ends, and the speed change section 125 (a change section) changes the itinerary plan in accordance with a result of prediction by the prediction section 124.

Thereby, the change of the itinerary plan is controlled such that a travel means arrives at a target point (for example, an intermediate point or the arrival point) when a task performed during the travel of the travel means ends; therefore, an event where the task ends earlier and too much time is left during travel or an event where the task is interrupted at the time of arrival at the target point can be suppressed; thus, the quality of a task during travel with a travel means can be improved.

Further, in the information processing apparatus 10 (information processing apparatus) according to the present embodiment, the input value acquisition section 111 (an acquisition section) acquires at least the departure point and the arrival point of the travel means of the itinerary inputted by the manipulation display section 12 (an input section), the itinerary setting section 113 (a candidate setting section) sets, on the basis of the departure point and the arrival point acquired by the input value acquisition section 111, one or more candidates for the itinerary including the one or more tasks set by the input value acquisition section 111, and the final checking section 115 (a confirmation section) confirms and determines, as an itinerary plan, a candidate selected from the one or more candidates set by the itinerary setting section 113.

Thereby, a candidate for an itinerary desired by the user can be determined as an itinerary plan from among candidates for an itinerary set on the basis of a departure point and an arrival point inputted.

Further, in the information processing apparatus 10 (information processing apparatus) according to the present embodiment, in a case where the task is being performed during travel with an automatic driving vehicle as the travel means, the speed change section 125 requests a change in speed of the automatic driving vehicle in accordance with the result of prediction by the prediction section 124.

Thereby, an automatic driving vehicle that is a travel means can be controlled in such a way as to arrive at a target point just when a task performed during travel ends.

Further, in the information processing apparatus 10 (information processing apparatus) according to the present embodiment, in a case where the task is being performed during travel with a vehicle that travels by driving by a driver as the travel means, the speed change section 125 instructs the driver to change speed of the vehicle in accordance with a result of prediction by the prediction section 124.

Thereby, the driver of a vehicle that is a travel means can be instructed to drive such that the vehicle arrives at a target point just when a task performed during travel ends.

Further, in the information processing apparatus 10 (information processing apparatus) according to the present embodiment, the speed change section 125 lowers a target speed of also the travel means in a case where progress of the task is behind the itinerary plan and raises the target speed of the travel means in a case where progress of the task is ahead of the itinerary plan, and performs processing of changing speed of the travel means to the target speed in a case where the target speed is within an allowable speed range (a predetermined speed range).

Thereby, a travel means can be controlled in such a way as to, within an allowable speed range, arrive at a target point just when a task performed during travel ends; therefore, the user riding in the travel means can be safely taken to the target point.

Further, in the information processing apparatus 10 (information processing apparatus) according to the present embodiment, the measure setting section 127 (the setting section), in a case where the target speed set by the speed change section 125 is outside the allowable speed range, creates one or more measure proposals to change the task included in the itinerary plan and sets a measure proposal selected from the one or more measure proposals as a measure proposal to be reflected in the itinerary plan, and the plan change section 128 (a plan change section) changes the itinerary plan on the basis of a measure proposal set by the measure setting section 127.

Thereby, when the speed of a travel means cannot be changed within an allowable speed range, the user can select from one or more measure proposals presented. Therefore, even though the contents of the original itinerary plan are to be changed, the itinerary plan can be changed by a measure proposal selected by the user as the next best measure, and thus a significant impairment in the quality of a task performed by the user can be suppressed.

Further, in the information processing apparatus 10 (information processing apparatus) according to the present embodiment, the traffic information acquisition section 122 (the acquisition section) acquires traffic information of an itinerary of the itinerary plan from the navigation/traffic information service 20B (a service) on the basis of at least the departure point and the arrival point, and the prediction section 124 predicts, on the basis of at least the traffic information acquired by the traffic information acquisition section 122, whether or not a task performed during execution of the itinerary plan will end before arrival of the travel means at the target point.

Thereby, whether a task will end when the travel means arrives or not can be predicted by using traffic information provided from the navigation/traffic information service 20B, and thus the accuracy of the prediction can be improved.

Further, in the information processing apparatus 10 (an information processing apparatus) according to the present embodiment, the itinerary setting section 113 defines requirements corresponding to one or more tasks, and receives one or more candidates for an itinerary including one or more tasks that are created by the navigation/traffic information service 20B (a service) on the basis of at least the departure point, the arrival point, and the requirements.

Thereby, candidate for an itinerary that satisfy requirements corresponding to the set tasks (road requirements, vehicle type requirements, user-specific requirements, etc.) can be set; thus, the quality of a task executed can be further enhanced.

Further, in the information processing apparatus 10 (an information processing apparatus) according to the present embodiment, the itinerary setting section 113 defines a vehicle type requirement regarding the travel means as the requirement, and receives a list of vehicle types that satisfy the vehicle type requirement, the list being created by the vehicle dispatch/automatic driving service 20C (a service), and incorporates the list into the set one or more candidates.

Thereby, a vehicle that satisfies vehicle type requirements regarding a travel means that performs the set tasks can be incorporated into candidates; thus, the quality of a task executed can be further enhanced.

Further, in the information processing apparatus 10 (an information processing apparatus) according to the present embodiment, the insurance setting section 114 (a setting section), on the basis of at least the itinerary plan, receives a list of insurances applicable to the itinerary plan from the insurance service 20D (a service), and sets an insurance selected from the list on the itinerary plan.

Thereby, an insurance suitable for the itinerary plan can be presented and applied; thus, the financial risk of the user who is executing the itinerary plan can be reduced, and the sense of security of the user can be strengthened.

Further, in the information processing apparatus 10 (an information processing apparatus) according to the present embodiment, in a case where a task of viewing and listening content is selected as a task to be performed in the itinerary, the task setting section 112 receives a list of content from the content service 20A (a service), and sets viewing and listening of content selected from the list as a task in the itinerary.

Thereby, it is controlled such that a travel means arrives at a target point (for example, an intermediate point or the arrival point) when the viewing and listening of content performed during the travel of the travel means ends; therefore, an event where the viewing and listening of content ends earlier and too much time is left during travel or an event where the viewing and listening of content is interrupted at the time of arrival at the target point can be suppressed; thus, the quality the viewing and listening of content as a task during travel with a travel means can be improved.

Further, in the information processing apparatus 10 (an information processing apparatus) according to the present embodiment, when a travel means has reached the neighborhood of an intermediate point corresponding to the next task after a task that is being performed during the execution of an itinerary plan, the neighborhood processing section 126 (a processing section) requests the store service 20F or the like (a service) corresponding to the next task to prepare for the next task.

Thereby, during the execution of a specific task, the service 20 such as the store service 20F corresponding to the next task can be caused to make advance preparation for the next task, and thus, smooth transition to the next task can be made after the end of the specific task.

2. First Embodiment

An information processing apparatus 10A according to a second embodiment will now be described centering on differences from the information processing apparatus 10 according to the first embodiment. In the present embodiment, an operation in which a job that can be simultaneously performed by mobility of a travel means within a range not greatly deviating from a target place (an arrival point) of a user is proposed and the job is executed to obtain an income is described.

(2-1. Configuration of Blocks of Information Processing Apparatus According to Second Embodiment)

Figure 16:
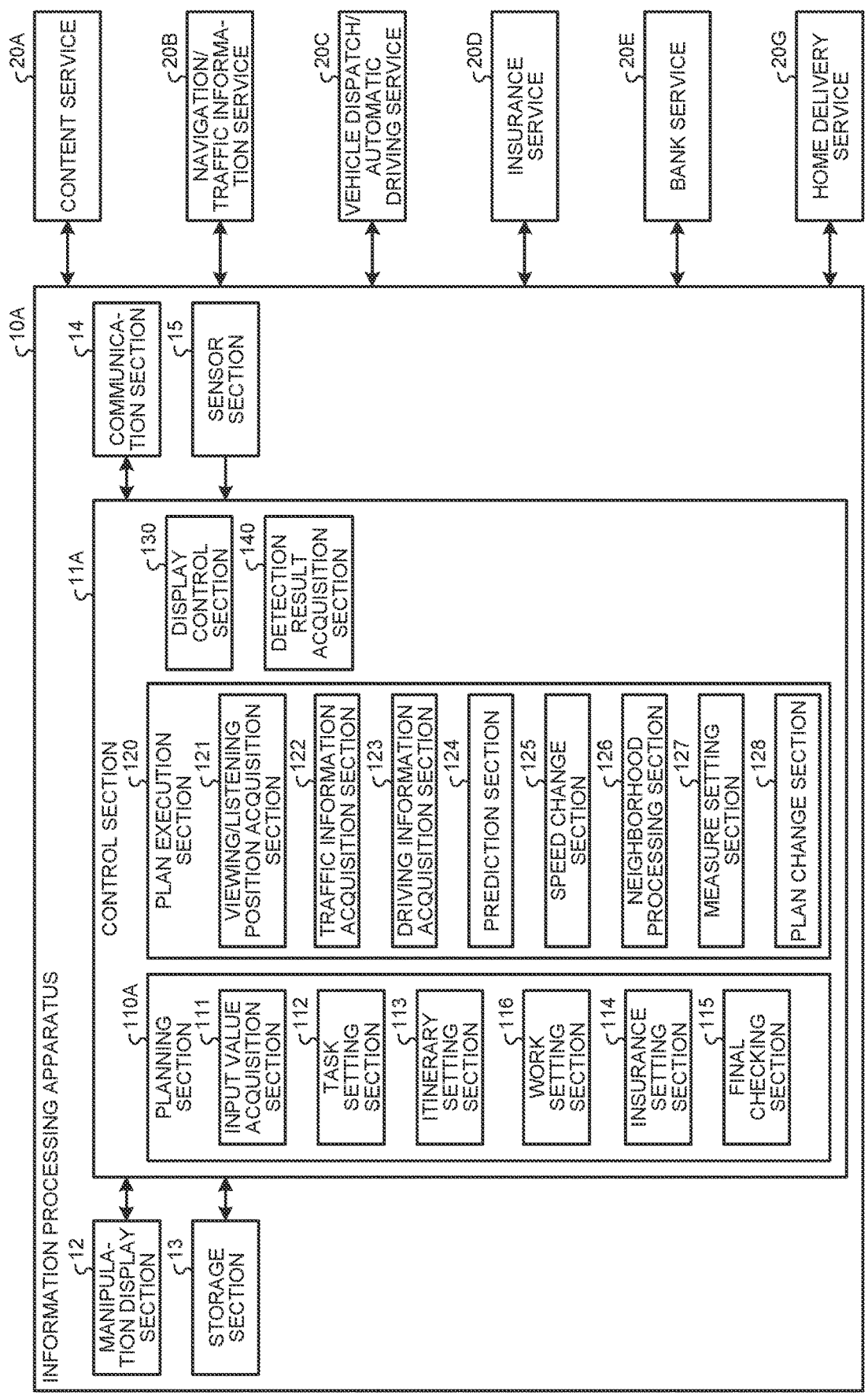
FIG. 16 is a diagram illustrating an example of a block configuration of an information processing apparatus according to a second embodiment.
Figure 17:
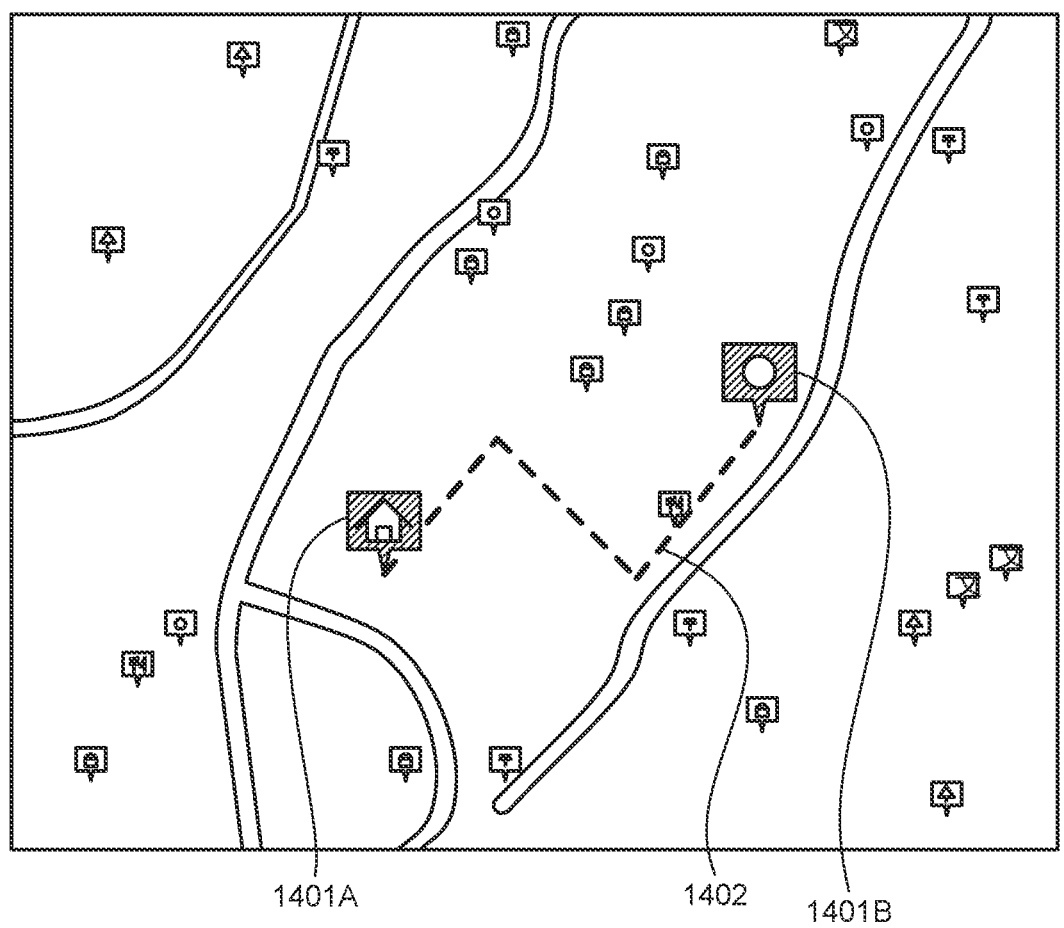
FIG. 17 is a diagram illustrating an example of a standard route.
Figure 18:
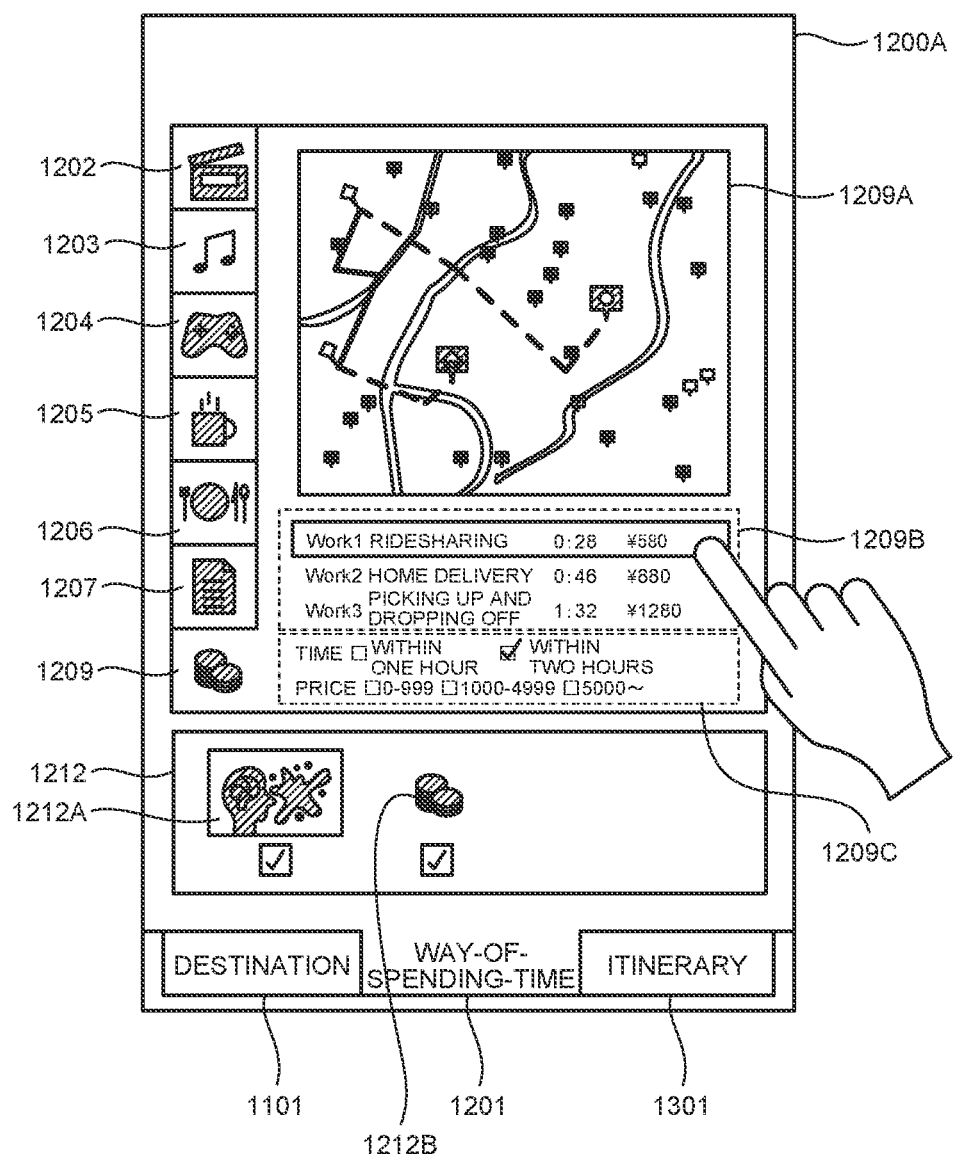
FIG. 18 is a diagram illustrating an example of a task setting screen of an application of the information processing apparatus according to the second embodiment.
Figure 19:
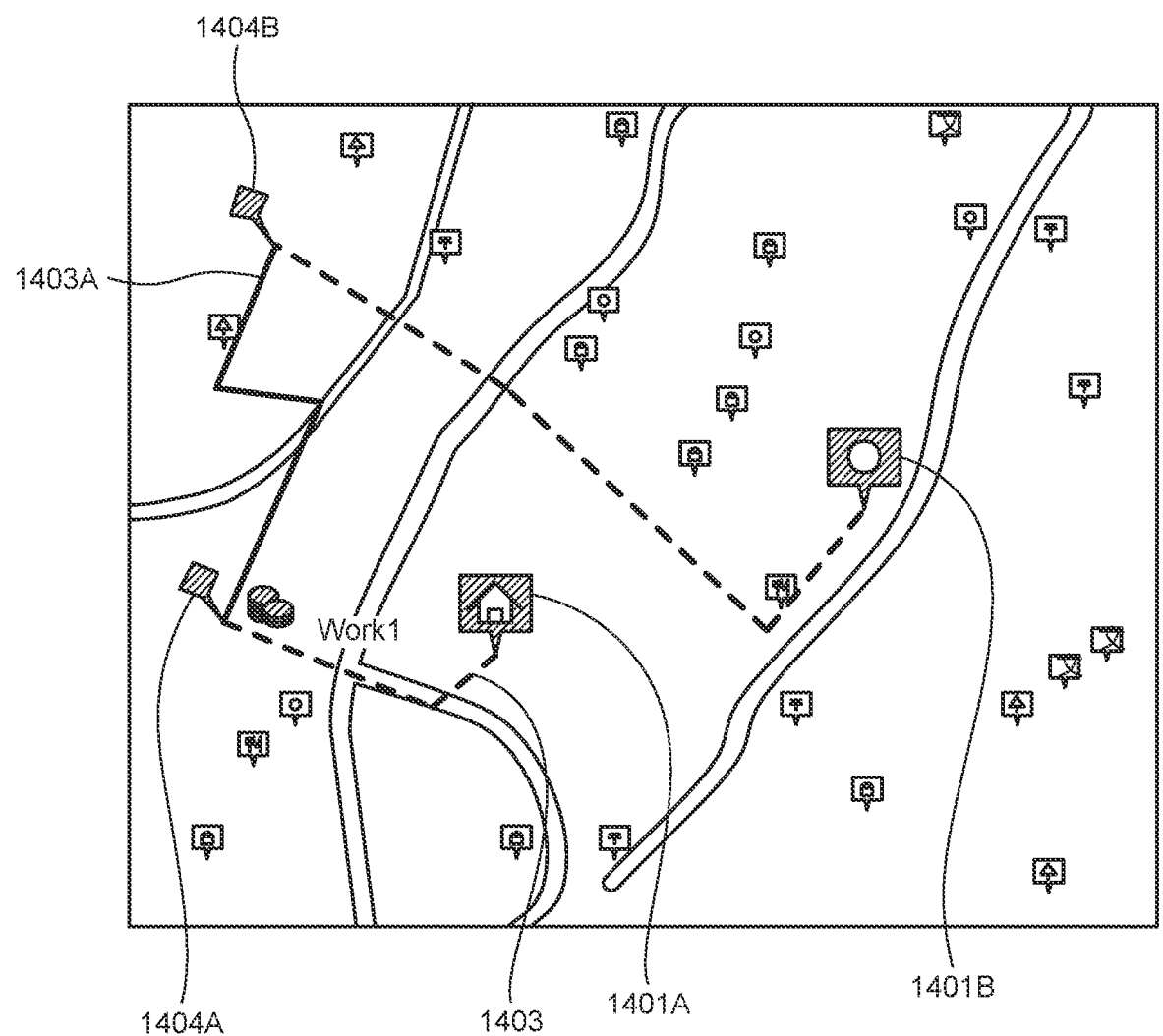
FIG. 19 is a diagram illustrating an example of a work-accommodated route.

FIG. 16 is a diagram illustrating an example of a block configuration of the information processing apparatus according to the second embodiment. FIG. 17 is a diagram illustrating an example of a standard route. FIG. 18 is a diagram illustrating an example of a task setting screen of an application of the information processing apparatus according to the second embodiment. FIG. 19 is a diagram illustrating an example of a work-accommodated route. Configurations and operations of blocks of the information processing apparatus 10A according to the present embodiment will now be described with reference to FIG. 16 to FIG. 19.

As illustrated in FIG. 16, the information processing apparatus 10A includes a control section 11A, a manipulation display section 12, a storage section 13, a communication section 14, and a sensor section 15.

The control section 11A is a processing section that is in charge of control of the information processing apparatus 10A. The control section 11A is implemented by a CPU, an MPU, or the like. The control section 11A includes, as illustrated in FIG. 16, a planning section 110A, a plan execution section 120, a display control section 130, and a detection result acquisition section 140.

The planning section 110A is a processing section that plans an itinerary as well as a task that can be performed during the itinerary for, in association with travel with a travel means, performing a task during the travel or at an intermediate point or the like. The planning section 110A is implemented by, for example, an application being executed by a CPU or an MPU. The planning section 110A includes, as illustrated in FIG. 16, an input value acquisition section 111, a task setting section 112, an itinerary setting section 113, a job setting section 116, an insurance setting section 114, and a final checking section 115. Note that the operations of the input value acquisition section 111, the task setting section 112, the itinerary setting section 113, the insurance setting section 114, and the final checking section 115 are similar to the operations described in the first embodiment described above.

The job setting section 116 is a processing section that sets a job that the user performs on the travel route from the departure point to the arrival point acquired by the input value acquisition section 111. Here, a job can be regarded as an aspect of a task. For example, the job setting section 116 sets, as a job to be executed by the user in the itinerary under planning, a job selected on a task setting screen 1200A illustrated in FIG. 18.

A task setting screen 1200A illustrated in FIG. 18 is a screen for setting a task (including a job) to be performed by the user in the itinerary under planning. The task setting screen 1200A includes, as illustrated in FIG. 18, a movie/drama tab 1202, a music tab 1203, a game tab 1204, a light meal tab 1205, a restaurant tab 1206, a job tab 1207, a work tab 1209, and a selected task display region 1212. Note that the movie/drama tab 1202, the music tab 1203, the game tab 1204, the light meal tab 1205, the restaurant tab 1206, and the job tab 1207 are as described in the first embodiment described above.

The work tab 1209 is a tab for displaying a screen for setting a job as a task using a travel means in the itinerary under planning. On the screen displayed by the work tab

1209, for example, an executable job is set on the basis of the departure point, the arrival point, and the arrival time that have been set.

The tabs for selecting tasks described above are examples, and it is not necessary that all the tabs described above be included.

The example of the task setting screen 1200A illustrated in FIG. 18 illustrates a state where a list of jobs that can be performed within a range not greatly deviating from the set departure point or arrival point is displayed by selecting the work tab 1209. When the work tab 1209 is selected, the job setting section 116 transmits, to a predetermined service 20 via the communication section 14, a request regarding jobs that can be performed within a range not greatly deviating from the set departure point or arrival point, together with candidates for an itinerary not including a job as a task that are set by the itinerary setting section 113. In this case, conditions such as time and the amount of money can be set in a filtering region 1209C included in the task setting screen 1200A, and also the conditions set here are transmitted to the predetermined service 20 by the job setting section 116. For example, a high-income job can be found out by selecting a condition of a large amount of money and performing filtering. In accordance with the request, the predetermined service 20 transmits, to the information processing apparatus 10, a list of jobs that can be performed in a range not greatly deviating from the departure point or the arrival point in the candidate for an itinerary and that satisfy conditions set for time, the amount of money, etc. When the list of jobs is received by the job setting section 116 via the communication section 14, the display control section 130 causes a work list display region 1209B of the task setting screen 1200A to display the list. Examples of the service 20 to which the request regarding jobs is transmitted include a home delivery service 20G illustrated in FIG. 16, a service for matching ridesharing or the like, etc.

In the example of the task setting screen 1200A illustrated in FIG. 18, three jobs of "Work 1: ridesharing", "Work 2: home delivery", and "Work 3: picking up and dropping off" are displayed as a list of jobs on the work tab 1209. For example, "Work 1: ridesharing" is a job of causing people to rideshare during the execution of a candidate for an itinerary; this takes 28 minutes, and can obtain an income of 580 yen. The income by this "Work 1: ridesharing" is an amount obtained by subtracting the fuel cost that is supposed to occur due to a detour caused by the execution of the job of ridesharing.

When a desired job is selected by the user from the list of jobs displayed in the work list display region 1209B and thereby the job is set by the job setting section 116, the itinerary setting section 113 first uses the requirement information corresponding to tasks (including a job) illustrated in FIG. 7 described above as a basis to define requirements corresponding to the task set by the task setting section 112 and the job set by the job setting section 116. Then, the itinerary setting section 113 transmits, to the navigation/traffic information service 20B via the communication section 14, the departure point, the arrival point, and the arrival time acquired by the input value acquisition section 111, information of the task set by the task setting section 112, information of the job as a task set by the job setting section 116, and the defined requirements.

On the basis of the received information of the departure point, the arrival point, an intermediate point prescribed by a task (including a job), the execution time of a task, etc., the navigation/traffic information service 20B creates candidates for routes from the departure point to the arrival point via the intermediate point, and creates candidates for an itinerary that satisfy the defined requirements and that include information of tasks (including a job). Then, the itinerary setting section 113 receives the created candidate for an itinerary from the navigation/traffic information service 20B via the communication section 14, and thereby sets candidates for an itinerary. Then, on the task setting screen 1200A, the display control section 130 causes a map display region 1209A to display route information in the candidate for an itinerary set by the itinerary setting section 113.

Here, FIG. 17 illustrates an example of a route (a standard route) of a candidate for an itinerary in the case where a job as a task is not included. On the map illustrated in FIG. 17, a standard route 1402 is illustrated as a route from a departure point indicated by a departure place icon 1401A to an arrival point indicated by an arrival place icon 1401B. In contrast, FIG. 19 illustrates an example of a route in a candidate for an itinerary in the case where a job ("Work 1: ridesharing" described above) as a task is added to the candidate for an itinerary of a standard route illustrated in FIG. 17. The route in a candidate for an itinerary illustrated in FIG. 19 is indicated by a work-accommodated route 1403, which starts from a departure point indicated by a departure place icon 1401A and passes through a point indicated by a work start point icon 1404A in order to, as a job, pick up a person to be taken together. Then, the user picks up the person at the point indicated by the work start point icon 1404A, passes through a route indicated by a ridesharing route portion 1403A, and drops off the person from the vehicle upon arrival at a point indicated by a work end point icon 1404B, which is a target point of the person. After that, the user goes toward a point indicated by an arrival place icon 1401B, which is the original arrival point of the user.

Further, an icon indicating the task set by the task setting section 112 and an icon indicating the job set by the job setting section 116 are displayed in the selected task display region 1212 on the task setting screen 1200A. FIG. 18 illustrates an example in which the viewing and listening of a documentary program is set by the task setting section 112 as a task in the itinerary under planning and ridesharing is set by the job setting section 116 as a job in the itinerary under planning. The task of viewing and listening a documentary program and the job of ridesharing are displayed as task icons 1212A and 1212B, respectively, in the selected task display region 1212.

The order of tasks and jobs to be performed in the itinerary under planning may be the order of the icons of the tasks and jobs set (displayed) in the selected task display region 1212, and the order of these may be one that can be arbitrarily changed. Further, the icon of the task and job set (displayed) in the selected task display region 1212 can be arbitrarily deleted.

Further, some or all of the processing sections implemented by the execution of software (a program) in the control section 11A illustrated in FIG. 16 may be implemented by a hardware circuit such as an FPGA or an ASIC.

The processing sections of the control section 11A illustrated in FIG. 16 conceptually illustrate functions, and the configuration is not limited to such a configuration. For example, a plurality of processing sections illustrated as independent processing sections in the control section 11A illustrated in FIG. 16 may be configured as one processing section. On the other hand, in the control section 11A illustrated in FIG. 16, the processing contents of one processing section may be divided into a plurality of pieces, and a plurality of processing sections may be configured.

(2-2. Itinerary Planning Processing of Information Processing Apparatus According to Second Embodiment)

FIGS. 20A and 20B are sequence diagrams illustrating an example of a flow of itinerary planning processing of the information processing apparatus according to the second embodiment. Note that, in the itinerary planning processing illustrated in FIGS. 20A and 20B, an operation of planning an itinerary plan that includes a task of going to a restaurant with an automatic driving vehicle and having a meal (hereinafter, referred to as a task of a restaurant) and a job of entrusted home delivery business on a route up to arrival at the restaurant is described. Processing contents will now be described for each step number written in FIGS. 20A and 20B.

Steps S101 to S104

The processing of steps S101 to S104 is similar to the processing of steps S11 to S14 illustrated in FIG. 13A described above, respectively.

Steps S105 and S106

Then, when the way-of-spending-time tab 1201 of the point/time input screen 1100 is selected by the user, the display control section 130 causes the task setting screen 1200A illustrated in FIG. 18 to be displayed. Then, when the restaurant tab 1206 is selected and an icon of a restaurant desired by the user is selected from the displayed list of restaurants, the task setting section 112 transmits, to the store service 20F via the communication section 14, a menu request that requests a menu of the restaurant. Herein, it is assumed that the store service 20F is a service of a restaurant.

Steps S107 and S108

Upon receiving the menu request, the store service 20F extracts menu information of the restaurant, and transmits the menu information to the information processing apparatus 10A.

Step S109

When the menu information is received by the task setting section 112 via the communication section 14, the display control section 130 causes the task setting screen 1200A to display a list of menus indicated by the menu information. Then, when a desired menu is selected by the user from the displayed list of menus, the task setting section 112 sets, as a task in the itinerary under planning, eating a dish of the selected menu at the restaurant.

Step S110

Then, the job setting section 116 of the planning section 110A transmits, to the bank service 20E via the communication section 14, a balance checking request for requesting the balance of a bank account of the user.

Steps S111 and S112

The bank service 20E extracts balance information of the corresponding bank account of the user in accordance with the received balance checking request, and transmits the balance information to the information processing apparatus 10A.

Step S113

The job setting section 116 checks the balance of the account of the user indicated by the balance information received via the communication section 14, and compares the balance and the fee of the menu of the task of a restaurant set by the itinerary setting section 113.

Step S114

Next, on the basis of the requirement information corresponding to tasks illustrated in FIG. 7 described above, the itinerary setting section 113 of the planning section 110A defines requirements corresponding to the tasks set by the task setting section 112 (for example, road requirements, vehicle type requirements, and user-specific requirements).

Step S115

Then, the itinerary setting section 113 transmits, to the navigation/traffic information service 20B via the communication section 14, the departure point, the arrival point, and the arrival time acquired by the input value acquisition section 111, information of the task set by the task setting section 112, and the defined requirements.

Steps S116 and S117

On the basis of the received information of the departure point, the arrival point, the execution time of a task, etc., the navigation/traffic information service 20B creates candidates for routes from the departure point to the arrival point, as illustrated in FIG. 8 described above. Note that the route of the candidate created here is a standard route like that illustrated in FIG. 17, that is, a route in the case where a job as a task is not included.

In addition, as illustrated in FIG. 8 described above, on the basis of received requirements, the navigation/traffic information service 20B integrates map information corresponding to the requirements, such as a dangerous region map including information regarding a dangerous region, a non-pavement/unevenness map including information of an unpaved road, a paved road free from unevenness, etc., and a road congestion map including information of road congestion. Then, from among the created candidates for routes, the navigation/traffic information service 20B further selects candidates for routes that satisfy all the requirements indicated by the integrated map information. As a result, the candidates for routes selected by the navigation/traffic information service 20B are created as candidates for an itinerary that satisfy the defined requirements and that include information of tasks. However, the candidate for an itinerary created here is an itinerary based on a standard route in the case where a job is not included as a task; this is referred to as a standard candidate for an itinerary. Then, the itinerary setting section 113 receives the created standard candidate for an itinerary from the navigation/traffic information service 20B via the communication section 14.

Step S118

Next, in the case where the result of comparison between the balance and the fee of the menu in step S113 shows that the balance is lower than the fee, the job setting section 116 performs, during the execution of the task of a restaurant, that is, during travel to the restaurant, the processing of collecting jobs each of which can be proposed as a job capable of, with its income, covering the difference. For example, the job setting section 116 transmits, to the home delivery service 20G via the communication section 14, a request (a home delivery business request) regarding home delivery business as a job that can be performed within a range not greatly deviating from the set departure point or arrival point, together with the standard candidate for an itinerary received by the itinerary setting section 113. Note that regardless of the result of comparison between the balance and the fee by the job setting section 116, the job setting section 116 may transmit, to the home delivery service 20G via the communication section 14, a home delivery business request together with the standard candidate for an itinerary.

Steps S119 to S121

In accordance with the received home delivery business request, the home delivery service 20G transmits, to the information processing apparatus 10A, a list of home delivery businesses that can be performed within a range not greatly deviating from the departure point or the arrival point in the standard candidate for an itinerary and that satisfy conditions set for time, the amount of money, etc. (including, for example, a condition of being capable of covering the difference described above). When the list of home delivery businesses is received by the job setting section 116 via the communication section 14, the display control section 130 causes the work list display region 1209B of the task setting screen 1200A to display the list.

Step S122

When a desired home delivery business is selected by the user from the list of jobs displayed in the work list display region 1209B, the home delivery business is set as a job by the job setting section 116. Then, on the basis of the requirement information corresponding to tasks (including jobs) illustrated in FIG. 7 described above, the itinerary setting section 113 defines requirements corresponding to the tasks set by the task setting section 112 and the jobs set by the job setting section 116.

Step S123

Then, the itinerary setting section 113 transmits, to the navigation/traffic information service 20B via the communication section 14, the departure point, the arrival point, and the arrival time acquired by the input value acquisition section 111, information of the task set by the task setting section 112, information of the job set by the job setting section 116, and the defined requirements.

Steps S124 and S125

On the basis of the received information of the departure point, the arrival point, intermediate points (the reception place and the delivery place of the home delivery article) prescribed by the job as a task, the execution time of a task, etc., the navigation/traffic information service 20B creates candidates for routes from the departure point to the arrival point through performing the home delivery business, as illustrated in FIG. 8 described above. As illustrated in FIG. 8 described above, on the basis of received requirements, the navigation/traffic information service 20B integrates map information corresponding to the requirements, such as a dangerous region map including information regarding a dangerous region, a non-pavement/unevenness map including information of an unpaved road, a paved road free from unevenness, etc., and a road congestion map including information of road congestion. Then, from among the created candidates for routes, the navigation/traffic information service 20B further selects candidates for routes that satisfy all the requirements indicated by the integrated map information. As a result, the candidates for routes selected by the navigation/traffic information service 20B are created as candidates for an itinerary that satisfy the defined requirements and that include information of tasks. Then, the itinerary setting section 113 receives the created candidate for an itinerary from the navigation/traffic information service 20B via the communication section 14, and thereby sets candidates for an itinerary. Although not illustrated in FIG. 20B for the sake of simplicity, also the acquisition of a list of vehicle types is performed by the processing of steps S25 to S27 of FIG. 13A described above.

Steps S126 to S132

The processing of steps S126 to S132 is similar to the processing of steps S128 to S34 illustrated in FIG. 13B described above, respectively. Note that, in the case of carrying fragile items in home delivery business, damage compensation insurance or the like may be proposed by the insurance service 20D.

Steps S133 and S134

Further, the final checking section 115 transmits, to the store service 20F via the communication section 14, a restaurant reservation request for requesting a reservation for a meal at a restaurant at the date and time indicated by the confirmed itinerary plan in order to execute the task of a restaurant included in the itinerary plan. Upon receiving the restaurant reservation request, the store service 20F performs the processing of reserving a meal of the menu selected in step S109 at the designated date and time.

Steps S135 and S136

Further, the final checking section 115 transmits, to the vehicle dispatch/automatic driving service 20C via the communication section 14, route information included in the confirmed itinerary plan and a vehicle dispatch reservation request regarding the vehicle type. Upon receiving the route information and the vehicle dispatch reservation information, the vehicle dispatch/automatic driving service 20C performs use reservation processing based on the route information for a vehicle of the designated vehicle type (herein, an automatic driving vehicle).

Steps S137 and S138

Further, the final checking section 115 transmits, to the home delivery service 20G via the communication section 14, a home delivery business entrustment request for accepting an order for home delivery business that is a job included in the confirmed itinerary plan. Upon receiving the home delivery business entrustment request, the home delivery service 20G performs the processing of entrusting the business of delivering a home delivery article from a designated reception place to a delivery place at the designated date and time.

Steps S139 and S140

Further, the final checking section 115 transmits, to the insurance service 20D via the communication section 14, an enrollment (application) reservation request regarding the insurance determined in step S131. Upon receiving the enrollment reservation request, the insurance service 20D performs the processing of reserving enrollment in the designated insurance.

Steps S141 and S142

Then, the final checking section 115 transmits, to the bank service 20E via the communication section 14, a settlement-of-accounts request regarding the payment of money necessary before the execution of the confirmed itinerary plan. Upon receiving the settlement-of-accounts request, the bank service 20E performs settlement-of-accounts processing regarding the payment of money necessary before the execution of the itinerary plan.

The flow of itinerary planning processing of the information processing apparatus 10A illustrated in FIGS. 20A and 20B are examples, and the itinerary planning processing is not limited to this flow. For example, the order of the processing of the steps illustrated in FIGS. 20A and 20B is not limited; for example, the processing of steps S133 and S134, steps S135 and S136, steps S137 and S138, steps S139 and S140, and steps S141 and S142 may be in any order.

(2-3. Effects of Information Processing Apparatus According to Second Embodiment)

As described above, in the information processing apparatus 10A (an information processing apparatus) according to the present embodiment, the job setting section 116 (a setting section) receives, from the home delivery service 20G or the like (a service) that presents a job, a list of jobs that can be performed in the itinerary on the basis of at least the departure point and the arrival point and sets a job selected from the list, and the itinerary setting section 113 (a determination section) determines the itinerary plan including a job set by the job setting section 116.

Thereby, not only can the quality of a task during travel with a travel means be improved, but also an income can be obtained by executing a job utilizing the travel means.

3. Other Embodiments

The processing according to the embodiments described above may be implemented in various different modes other than the above embodiments.

Although in the task of a light meal described above, the store service 20F is used to stop by a fixed store as a place to eat a light meal or a place to take out a light meal, the configuration is not limited thereto. For example, in a store service in a form in which a light meal is provided by a mobile store such as wagon selling, the itinerary plan and the current position may be shared with the store service by using an application of the information processing apparatus 10 or 10A, and the place to meet for eating or taking out a light meal may be dynamically determined.

Further, in the example of plan execution processing illustrated in FIG. 14 described above, in step S81, the neighborhood processing section 126 transmits a light meal preparation request to the store service 20F when the automatic driving vehicle has reached the neighborhood of the intermediate point (store) of the task of a light meal that is the next task; however, the configuration is not limited thereto. For example, the information processing apparatus 10 or 10A can reduce waiting time for receiving the service from the service 20 by notifying another service 20 of the current position. For example, when a user (the information processing apparatus 10 or 10A) approaches a hospital, the hospital service 20J may notify the hospital of the approach, and automatically accepts a medical examination order; thereby, the user can have a medical examination without turn waiting.

Further, the plan execution section 120 may adjust an itinerary plan currently being executed by using a detection result that the detection result acquisition section 140 has acquired through biological sensing (the sensor section 15). For example, in the case where a task of performing a job in a vehicle of a travel means is being performed during the execution of an itinerary plan, when the sensor section 15 (for example, an imaging device) has detected that the user feels drowsy, the plan execution section 120 may adjust the itinerary plan, and make a proposal to add a task of refreshing by stopping by a cafe or the like and drinking coffee.

Further, in the embodiments described above, the application of the information processing apparatus 10 or 10A independently manages the execution of an itinerary plan while performing data communication with the service 20; however, the configuration is not limited thereto. For example, the speed change sections 125 of information processing apparatuses 10 and/or 10A of a plurality of users may share itinerary plans currently being executed, driving information, etc., and may perform control of synchronizing arrivals at a common arrival point. In the case of waiting with an acquaintance or in like cases, it is often the case that either of them comes earlier and has too much time on the hands; however, by using synchronization control like that described above, in the case where acquaintances in different places gather or in like cases, information of the travel means of them can be shared to perform speed control such that, while enjoying the same movie content in the respective vehicles, all the people arrive at the meeting place just at the timing when the content ends. Thereby, occasions of having too much time on the hands can be lessened, and a topic of content or the like can be shared immediately.

In this case, in the information processing apparatuses 10 and 10A (information processing apparatuses), the speed change section 125 (the change section) shares the itinerary plan determined by the final checking section 115 (the determination section) and an itinerary plan that is being executed by another information processing apparatus, and performs control of synchronizing arrivals at a common arrival point.

Thereby, the itinerary plan currently being executed by each information processing apparatus can be shared with the other information processing apparatuses, and the user of each information processing apparatus can meet without having too much time on the hands or experiencing interruption of a task.

Further, each of the embodiments described above is described on the supposition that an automatic driving vehicle is used as a travel means; however, the travel means is not limited thereto, and a vehicle manually driven by a driver, which is not an automatic driving vehicle, a vehicle semi-automatically driven, a share car, a taxi, a railway, or the like can also be used as a travel means. For example, in an itinerary plan in which a user rents and uses a share car as a travel means for one day, although the user uses the share car on a day trip from Tokyo to Shizuoka, the rental cost can be covered by incorporating businesses of ridesharing and home delivery as jobs. Further, as an example of an itinerary plan in which a route using a share car is incorporated in part of the route, an itinerary plan can be incorporated in which, for example, the user travels on a railway between stations and upon arriving at a station, the user can get in a share car, which is already on standby, with no waiting time. Further, it is also possible to set an itinerary plan in which a driver is instructed of a route and a speed in accordance with a task selected by a fellow passenger. For example, with the aim of arriving at an arrival point at the timing when a drama selected by a fellow passenger ends, a route and a driving speed can be proposed in cooperation with the navigation/traffic information service 20B, and thus the itinerary plan currently being executed can be changed. Further, it is also possible to make a proposal by combining a place where automatic driving is possible (for example, an expressway) and a case where a place where a person drives is set. Further, in the case of an itinerary plan in which a vehicle manually driven by a driver, which is not an automatic driving vehicle, or a vehicle semi-automatically driven is used as a travel means, when an incident such as a delay of the vehicle occurs, the plan execution section 120 may, in the plan execution processing illustrated in FIG. 14, notify the driver (the user or the like) who drives the vehicle of the occurrence of the incident, and instruct the driver to change the speed.

4. Hardware Configuration

Figure 21:
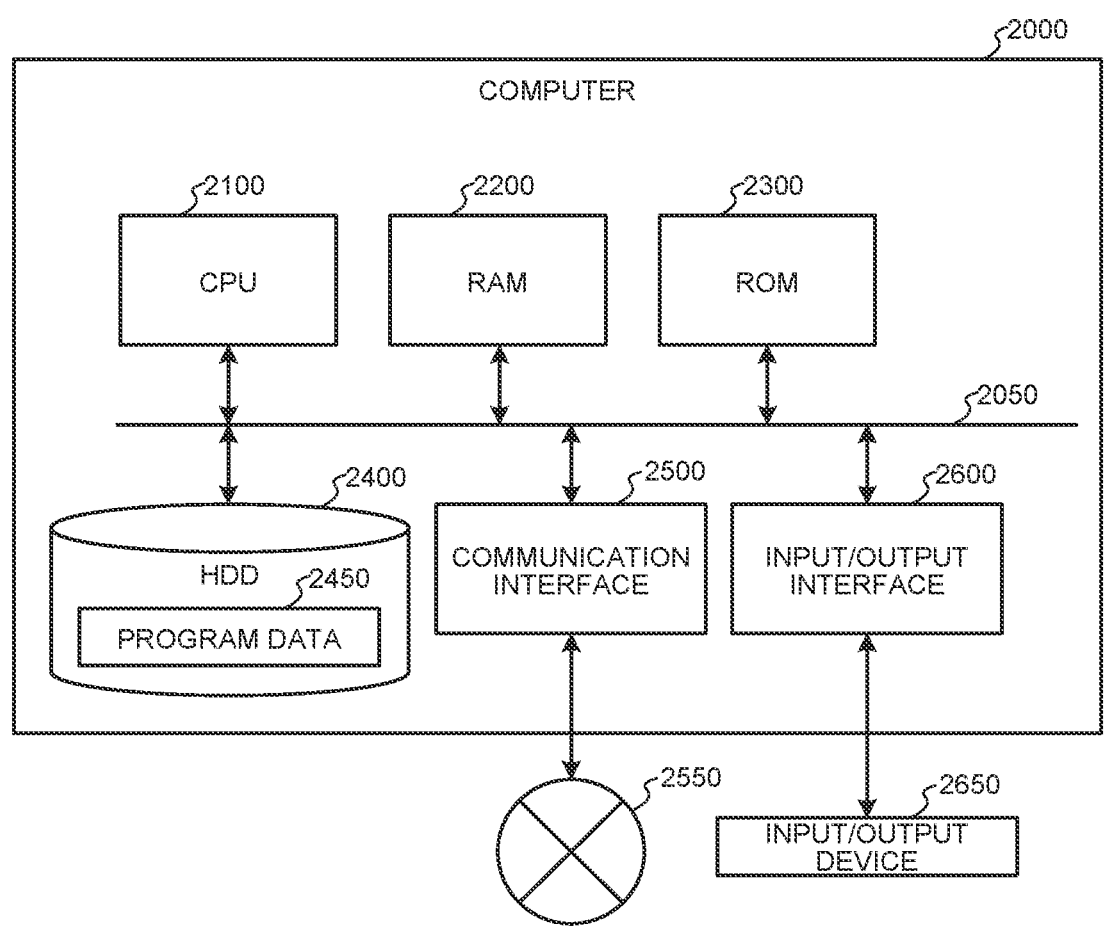
FIG. 21 is a diagram illustrating an example of a hardware configuration of a computer that implements functions of an information processing apparatus.

FIG. 21 is a diagram illustrating an example of a hardware configuration of a computer that implements functions of an information processing apparatus. A hardware configuration of a computer that implements the information processing apparatuses 10 and 10A according to the above-described embodiments will be described with reference to FIG. 21.

The information processing apparatuses 10 and 10A according to each embodiment described above are implemented by, for example, a computer 2000 having a configuration like that illustrated in FIG. 21. The computer 2000 includes a CPU 2100, a RAM 2200, a read-only memory (ROM) 2300, a hard disk drive (HDD) 2400, a communication interface 2500, and an input/output interface 2600. Each section of the computer 2000 is connected by a bus 2050.

The CPU 2100 is an arithmetic device that operates on the basis of a program (for example, the above-described application) stored in the ROM 2300 or the HDD 1400 and controls each section. For example, the CPU 2100 develops a program stored in the ROM 2300 or the HDD 2400 onto the RAM 2200, and executes processing corresponding to various programs.

The ROM 2300 stores a boot program such as a basic input output system (BIOS) that is executed by the CPU 2100 when the computer 2000 is activated, a program depending on the hardware of the computer 2000, etc.

The HDD 2400 is a computer-readable recording medium that non-temporarily records a program to be executed by the CPU 2100, data to be used by the program, etc. Specifically, the HDD 2400 is a recording medium that records an information processing program (application) according to the present disclosure that is an example of program data 2450. Note that the computer 2000 may be a non-volatile recording medium such as a solid state drive (SSD) or a flash memory instead of the HDD 2400 or the like.

The communication interface 2500 is an interface for the computer 2000 to connect to an external network 2550 (corresponding to the network N illustrated in FIG. 1). For example, the CPU 2100 receives data from another device or transmits data generated by the CPU 2100 to another device via the communication interface 2500.

The input/output interface 2600 is an interface for connecting an input/output device 2650 and the computer 2000. For example, the CPU 2100 receives data from an input device such as a keyboard and a mouse via the input/output interface 2600. Further, the CPU 2100 transmits data to an output device such as a display, a speaker, or a printer via the input/output interface 2600. The input/output interface 2600 may function as a media interface that reads a program, etc. recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in the case where the computer 2000 functions as the information processing apparatuses 10 and 10A according to the above-described embodiments, the CPU 2100 of the computer 2000 executes a program ((application or the like) loaded on the RAM 2200, thereby implementing the functions of the planning sections 110 and 110A, the plan execution section 120, the display control section 130, the detection result acquisition section 140, and the like. The HDD 2400 stores an application, etc. according to the present disclosure. Although the CPU 2100 reads the program data 2450 from the HDD 2400 and executes the program data, these programs may be acquired from another device via the external network 2550, as another example.

5. Summary

The effects described in the present specification are merely examples and are not limitative ones, and there may be other effects. Furthermore, each embodiment of the present disclosure is not limited to the above-described embodiment, and various modifications, combinations, and the like can be made without departing from the gist of the present disclosure.

Furthermore, the present disclosure can also have the following configurations, for example.

(1)

An information processing apparatus comprising:
  a setting section that sets one or more tasks that are scheduled to be executed during travel from a departure point to an arrival point of an itinerary;
  a determination section that, on the basis of the departure point, the arrival point, and the one or more tasks, determines an itinerary plan including one or more travel means from the departure point to the arrival point and a task that is scheduled to be executed during travel with each of the travel means;
  a prediction section that predicts whether or not a task performed during execution of the itinerary plan will end before arrival of the travel means at a target point that is supposed to be reached when the task ends; and
  a change section that changes the itinerary plan in accordance with a result of prediction by the prediction section.

(2)

The information processing apparatus according to (1), further comprising:
  an acquisition section that acquires at least the departure point and the arrival point of the travel means of the itinerary inputted by an input section,
  wherein the determination section includes:
    a candidate setting section that, on the basis of the departure point and the arrival point acquired by the acquisition section, sets one or more candidates for the itinerary including the one or more tasks set by the setting section; and a confirmation section that confirms and determines, as an itinerary plan, a candidate selected from the one or more candidates set by the candidate setting section.

(3)

The information processing apparatus according to (1) or (2), wherein, in a case where the task is being performed during travel with an automatic driving vehicle as the travel means, the change section requests a change in speed of the automatic driving vehicle in accordance with the result of prediction by the prediction section.

(4)

The information processing apparatus according to (1) or (2), wherein, in a case where the task is being performed during travel with a vehicle that travels by driving by a driver as the travel means, the change section instructs the driver to change speed of the vehicle in accordance with a result of prediction by the prediction section.

(5)

The information processing apparatus according to any one of (1) to (4), wherein
the change section lowers a target speed of also the travel means in a case where progress of the task is behind the itinerary plan and raises the target speed of the travel means in a case where progress of the task is ahead of the itinerary plan, and
performs processing of changing speed of the travel means to the target speed in a case where the target speed is within a predetermined speed range.

(6)

The information processing apparatus according to (5), wherein
the setting section, in a case where the target speed set by the change section is outside the predetermined speed range, creates one or more measure proposals to change the task included in the itinerary plan and sets a measure proposal selected from the one or more measure proposals as a measure proposal to be reflected in the itinerary plan, and
the information processing apparatus further comprises a plan change section that changes the itinerary plan on the basis of a measure proposal set by the setting section.

(7)

The information processing apparatus according to any one of (1) to (6), wherein the setting section receives, from a service that presents a job, a list of jobs that can be performed in the itinerary on the basis of at least the departure point and the arrival point and sets a job selected from the list, and
the determination section determines the itinerary plan including a job set by the setting section.

(8)

The information processing apparatus according to (2), wherein the acquisition section acquires traffic information of an itinerary of the itinerary plan from a service on the basis of at least the departure point and the arrival point, and
the prediction section predicts, on the basis of at least the traffic information acquired by the acquisition section, whether or not a task performed during execution of the itinerary plan will end before arrival of the travel means at the target point.

(9)

The information processing apparatus according to (2), wherein the candidate setting section
defines a requirement corresponding to the one or more tasks, and
receives the one or more candidates for the itinerary including the one or more tasks that are created by a service on the basis of at least the departure point, the arrival point, and the requirement.

(10)

The information processing apparatus according to (9), wherein the candidate setting section
defines a vehicle type requirement regarding the travel means as the requirement, and
receives a list of vehicle types that satisfy the vehicle type requirement, the list being created by a service, and incorporates the list into the set one or more candidates.

(11)

The information processing apparatus according to any one of (1) to (10), wherein the setting section, on the basis of at least the itinerary plan, receives a list of insurances applicable to the itinerary plan from a service, and sets an insurance selected from the list on the itinerary plan.

(12)

The information processing apparatus according to any one of (1) to (11), wherein, in a case where a task of viewing and listening content is selected as a task to be performed in the itinerary, the setting section receives a list of content from a service, and sets viewing and listening of content selected from the list as a task in the itinerary.

(13)

The information processing apparatus according to any one of (1) to (12), further comprising: a processing section that, when the travel means has reached a neighborhood of an intermediate point corresponding to a next task after a task performed during execution of the itinerary plan, requests a service corresponding to the next task to prepare for the next task.

(14)

The information processing apparatus according to any one of (1) to (13), wherein the change section shares the itinerary plan determined by the determination section and an itinerary plan that is being executed by another information processing apparatus, and performs control of synchronizing arrivals at a common arrival point.

(15)

An information processing method comprising
by a computer:
setting one or more tasks that are scheduled to be executed during travel from a departure point to an arrival point of an itinerary;
on the basis of the departure point, the arrival point, and the one or more tasks, determining an itinerary plan including one or more travel means from the departure point to the arrival point and a task that is scheduled to be executed during travel with each of the travel means;
predicting whether or not a task performed during execution of the itinerary plan will end before arrival of the travel means at a target point that is supposed to be reached when the task ends; and
changing the itinerary plan in accordance with a result of prediction.

(16)

A storage medium in which a program is stored, the program being configured to cause
a computer to function as:
a setting section that sets one or more tasks that are scheduled to be executed during travel from a departure point to an arrival point of an itinerary;
a determination section that, on the basis of the departure point, the arrival point, and the one or more tasks, determines an itinerary plan including one or more travel means from the departure point to the arrival point and a task that is scheduled to be executed during travel with each of the travel means;
a prediction section that predicts whether or not a task performed during execution of the itinerary plan will end before arrival of the travel means at a target point that is supposed to be reached when the task ends; and
a change section that changes the itinerary plan in accordance with a result of prediction by the prediction section.

REFERENCE SIGNS LIST 10, 10A INFORMATION PROCESSING APPARATUS
11, 11A CONTROL SECTION
12 MANIPULATION DISPLAY SECTION
13 STORAGE SECTION
14 COMMUNICATION SECTION
20 SERVICE
20A CONTENT SERVICE
20B NAVIGATION/TRAFFIC INFORMATION SERVICE
20C VEHICLE DISPATCH/AUTOMATIC DRIVING SERVICE
20D INSURANCE SERVICE
20E BANK SERVICE
20F STORE SERVICE
20G HOME DELIVERY SERVICE
20H USER AUTHENTICATION SERVICE
20I TOURISM SERVICE
20J HOSPITAL SERVICE
20K BREAK SERVICE
110, 110A PLANNING SECTION
111 INPUT VALUE ACQUISITION SECTION
112 TASK SETTING SECTION
113 ITINERARY SETTING SECTION
114 INSURANCE SETTING SECTION
115 FINAL CHECKING SECTION
116 JOB SETTING SECTION
120 PLAN EXECUTION SECTION
121 VIEWING/LISTENING POSITION ACQUISITION SECTION
122 TRAFFIC INFORMATION ACQUISITION SECTION
123 DRIVING INFORMATION ACQUISITION SECTION
124 PREDICTION SECTION
125 SPEED CHANGE SECTION
126 NEIGHBORHOOD PROCESSING SECTION
127 MEASURE SETTING SECTION
128 PLAN CHANGE SECTION
130 DISPLAY CONTROL SECTION
140 DETECTION RESULT ACQUISITION SECTION

The invention claimed is:

1. A first information processing apparatus, comprising:
a central processing unit (CPU) configured to:
set a plurality of tasks for execution in a travel from a departure point to an arrival point of an itinerary;
determine, based on the departure point, the arrival point, and the plurality of tasks, a first itinerary plan that includes:
at least one travel means from the departure point to the arrival point; and
a first task for execution in the travel with the at least one travel means, wherein the plurality of tasks includes the first task;
predict a result that indicates a completion of the first task before arrival of the at least one travel means at a target point, wherein
the first task is performed by a user in execution of the first itinerary plan, and
the target point corresponds to an end location of the first task;
change the first itinerary plan based on the predicted result of the completion of the first task; and
control the at least one travel means based on the changed first itinerary plan.

2. The first information processing apparatus according to claim 1, wherein the CPU is further configured to:
acquire the departure point and the arrival point of the at least one travel means from the itinerary;
set, based on the acquired departure point and the acquired arrival point, a plurality of candidate itineraries that includes the set plurality of; and
determine, as the first itinerary plan, a candidate itinerary from the set plurality of candidate itineraries.

3. The first information processing apparatus according to claim 1, wherein the CPU is further configured to:
determine that the user performs the first task in the travel with the at least one travel means, wherein the at least one travel means corresponds to an automatic driving vehicle; and
generate a request to change a speed of the automatic driving vehicle based on the predicted result and the determination that the user performs the first task.

4. The first information processing apparatus according to claim 1, wherein the CPU is further configured to:
determine that the user performs the first task in the travel with the at least one travel means, wherein the at least one travel means corresponds to a vehicle that is driven by a driver; and
instruct the driver to change a speed of the vehicle based on the predicted result and the determination that the user performs the first task.

5. The first information processing apparatus according to claim 1, wherein the CPU is further configured to:
determine a progress of the first task;
decrease a target speed of the at least one travel means based on the determined progress is behind a schedule of the first itinerary plan;
increase the target speed of the at least one travel means based on the determined progress is ahead of the schedule of the first itinerary plan;
determine the target speed of the at least one travel means; and
perform a processing to change a speed of the at least one travel means based on the determined target speed is in a specific speed range.

6. The first information processing apparatus according to claim 5, wherein the CPU is further configured to:
create, based on the determined target speed is outside the specific speed range, a plurality of measure proposals to change the first task;
select a measure proposal from the created plurality of measure proposals; and
change the first itinerary plan based on the selected measure proposal, wherein the changed first itinerary plan includes the selected measure proposal.

7. The first information processing apparatus according to claim 1, wherein the CPU is further configured to:
receive, from a service that presents a plurality of jobs, a list of jobs based on the departure point and the arrival point, wherein the list of jobs is performable by the user in the itinerary, and the plurality of jobs includes the list of jobs;

select a job from the list of jobs; and determine the first itinerary plan further based on the selected job, wherein the determined first itinerary plan includes the selected job.

8. The first information processing apparatus according to claim 2, wherein the CPU is further configured to:

acquire, from a service, traffic information of the first itinerary plan based on the departure point and the arrival point; and predict, further based on the acquired traffic information, the result that indicates the completion of the first task before arrival of the at least one travel means at the target point.

9. The first information processing apparatus according to claim 2, wherein the CPU is further configured to:

define a requirement corresponding to the plurality of tasks, and receive the plurality of candidate itineraries further based on the departure point, the arrival point, and the defined requirement.

10. The first information processing apparatus according to claim 9, wherein the CPU is further configured to:

define, as the requirement, a vehicle type requirement associated with the at least one travel means;

receive, from a service, a list of vehicle types that satisfies the vehicle type requirement; and incorporate the received list of vehicle types in the set plurality of candidate itineraries.

11. The first information processing apparatus according to claim 1, wherein the CPU is further configured to:

receive, from a service, a list of insurances based on the first itinerary plan, wherein the list of insurances is applicable to the first itinerary plan;

select an insurance from the list of insurances; and change the first itinerary plan based on the selected insurance, wherein the changed first itinerary plan includes the selected insurance.

12. The first information processing apparatus according to claim 1, wherein, the CPU is further configured to:

determine that the user selects a task to view and listen to a content as the first task;

receive a list of content from a service;

select the content from the list of content; and set, as the first task, a viewing task and a listening task of the selected content.

13. The first information processing apparatus according to claim 1, wherein the CPU is further configured to:

determine that the at least one travel means is in a vicinity of an intermediate point, wherein the intermediate point is corresponding to a second task after a completion of the first task in the first itinerary plan; and request, based on the determination that the at least one travel means is in the vicinity of the intermediate point, a service corresponding to the second task.

14. The first information processing apparatus according to claim 1, wherein the CPU is further configured to:

control a transmission of the first itinerary plan to a second information processing apparatus;

control a reception of a second itinerary plan executed by the second information processing apparatus; and control, based on the transmission of the first itinerary plan and the reception of the second itinerary plan, a synchronized arrival of each of the first information processing apparatus and the second information processing apparatus at a common arrival point.

15. An information processing method, comprising:

setting, by a central processing unit (CPU), a plurality of tasks for execution in a travel from a departure point to an arrival point of an itinerary;

determining, by the CPU, an itinerary plan based on the departure point, the arrival point, and the plurality of tasks, wherein the itinerary plan includes:

at least one travel means from the departure point to the arrival point; and a task for execution in the travel with the at least one travel means, wherein the plurality of tasks includes the task;

predicting, by the CPU, a result that indicates a completion of the task before arrival of the at least one travel means at a target point, wherein the task is performed by a user in execution of the itinerary plan, and the target point corresponds to an end location of the task;

changing, by the CPU, the itinerary plan based on the predicted result of the completion of the task; and controlling, by the CPU, the at least one travel means based on the changed itinerary plan.

16. A non-transitory computer-readable medium having stored thereon, computer-executable instructions which, when executed by a computer, cause the computer to execute operations, the operations comprising:

set a plurality of tasks for execution in a travel from a departure point to an arrival point of an itinerary;

determine, based on the departure point, the arrival point, and the plurality of tasks, a itinerary plan that includes:

at least one travel means from the departure point to the arrival point; and a task for execution in the travel with the at least one travel means, wherein the plurality of tasks includes the task;

predict a result that indicates a completion of the task before arrival of the at least one travel means at a target point, wherein the task is performed by a user in execution of the itinerary plan, and the target point corresponds to an end location of the task;

change the itinerary plan based on the predicted result of the completion of the task; and control the at least one travel means based on the changed itinerary plan.

* * * * *